United States Patent
Kim et al.

(10) Patent No.: US 12,531,939 B2
(45) Date of Patent: Jan. 20, 2026

(54) ELECTRONIC DEVICE COMPRISING HINGE MODULE

(71) Applicant: SAMSUNG ELECTRONICS CO., LTD., Suwon-si (KR)

(72) Inventors: Jongkeun Kim, Suwon-si (KR); Hyungsoo Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 326 days.

(21) Appl. No.: 18/202,763

(22) Filed: May 26, 2023

(65) Prior Publication Data

US 2023/0308531 A1 Sep. 28, 2023

Related U.S. Application Data

(63) Continuation of application No. PCT/KR2021/016746, filed on Nov. 16, 2021.

(30) Foreign Application Priority Data

Dec. 30, 2020 (KR) .................. 10-2020-0187193
May 27, 2021 (KR) .................. 10-2021-0068201

(51) Int. Cl.
*H04M 1/02* (2006.01)
*G06F 1/16* (2006.01)

(52) U.S. Cl.
CPC ........ *H04M 1/0216* (2013.01); *G06F 1/1616* (2013.01); *G06F 1/1681* (2013.01); *H04M 1/0268* (2013.01)

(58) Field of Classification Search
None
See application file for complete search history.

(56) References Cited

U.S. PATENT DOCUMENTS

| 11,294,431 B2 | 4/2022 | Torres et al. |
| 11,622,457 B2 | 4/2023 | Hsu |

(Continued)

FOREIGN PATENT DOCUMENTS

| CN | 203743188 U | 7/2014 |
| CN | 210318147 U | 4/2020 |

(Continued)

OTHER PUBLICATIONS

International Search Report (PCT/ISA/210) issued Mar. 2, 2022 by the International Searching Authority in counterpart International Patent Application No. PCT/KR2021/016746.

(Continued)

*Primary Examiner* — Frantz Bataille
(74) *Attorney, Agent, or Firm* — Sughrue Mion, PLLC

(57) ABSTRACT

Provided is an electronic device including: a first and second housings; a display; and a hinge module connecting the first and second housings, the hinge module comprising: a rotation structure including first and second rotation members, and a rotation bracket for accommodating the first and second rotation members; and an interlocking structure including first and second spiral rotation members, a first guide member which surrounds at least a portion of the first spiral rotation member, a second guide member which surrounds at least a portion of the second spiral rotation member, and a slide member including a first through hole for accommodating the first spiral rotation member, and a second through hole for accommodating the second spiral rotation member, the slide member being configured to slide based on the movement of the first spiral rotation member or the second spiral rotation member.

20 Claims, 26 Drawing Sheets

(56) References Cited

U.S. PATENT DOCUMENTS

| | | | |
|---|---|---|---|
| 2010/0251518 A1* | 10/2010 | Chiang | G06F 1/1681 16/277 |
| 2015/0327383 A1 | 11/2015 | Hsu | |
| 2019/0040904 A1 | 2/2019 | Hsu | |
| 2019/0250676 A1* | 8/2019 | Lin | E05D 11/082 |
| 2020/0267859 A1 | 8/2020 | Kim et al. | |
| 2020/0329574 A1 | 10/2020 | Lee | |
| 2020/0348732 A1 | 11/2020 | Kang et al. | |
| 2021/0208641 A1 | 7/2021 | Huang et al. | |
| 2022/0116489 A1 | 4/2022 | Nagai et al. | |

FOREIGN PATENT DOCUMENTS

| | | |
|---|---|---|
| CN | 210423406 U | 4/2020 |
| CN | 111435954 A | 7/2020 |
| CN | 211423150 U | 9/2020 |
| CN | 111816067 A | 10/2020 |
| CN | 111853048 A | 10/2020 |
| CN | 112153178 A | 12/2020 |
| JP | 2015-158216 A | 9/2015 |
| KR | 10-2016-0124317 A | 10/2016 |
| KR | 10-1731375 B1 | 4/2017 |
| KR | 10-2019-0097898 A | 8/2019 |
| KR | 10-2019-0110244 A | 9/2019 |
| KR | 10-2108151 B1 | 5/2020 |
| KR | 10-2020-0101239 A | 8/2020 |
| KR | 10-2020-0120474 A | 10/2020 |
| KR | 10-2020-0126524 A | 11/2020 |
| WO | 2020/029062 A1 | 2/2020 |

OTHER PUBLICATIONS

Written Opiniont (PCT/ISA/237) issued Mar. 2, 2022 by the International Searching Authority in counterpart International Patent Application No. PCT/KR2021/016746.

Extended European Search Report dated Mar. 19, 2024 in European Application No. 21915518.1.

Communication issued Jun. 30, 2025 by the State Intellectual Property Office of P.R. China in counterpart Chinese Patent Application No. 202180083272.0.

* cited by examiner

ELECTRONIC DEVICE COMPRISING HINGE MODULE

CROSS-REFERENCE TO RELATED APPLICATIONS

This application is a by-pass continuation of International Application No. PCT/KR2021/016746, filed on Nov. 16, 2021, which is based on and claims priority to Korean Patent Application No. 10-2021-0068201, filed on May 27, 2021, and Korean Patent Application No. 10-2020-0187193, filed on Dec. 30, 2020, in the Korean Intellectual Property Office, the disclosures of which are incorporated by reference herein in their entireties.

BACKGROUND

1. Field

The disclosure relates to an electronic device including a hinge module.

2. Description of Related Art

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling and e-wallet functions. Such electronic devices become compact enough for users to carry in a convenient way.

As mobile communication services extend up to multimedia service sectors, electronic devices require a larger display to allow users satisfactory use of multimedia services as well as voice call or text messaging services. This, however, trades off the trend of electronic devices being compact.

An electronic device (e.g., a portable terminal) includes a display having a flat surface or both a flat surface and a curved surface. An electronic device including a display may have a limitation in realizing a screen larger than the size of the electronic device due to the fixed display structure. Accordingly, research has been conducted on electronic devices including a foldable or rollable display.

In implementing a foldable electronic device, it may be difficult to secure mechanical stability while enabling structures of the electronic device to move relative to one another (e.g., slide, rotate, or pivot). For example, it may be hard to secure a stable operation structure while securing or maintaining portability by downsizing or slimming down foldable electronic devices.

SUMMARY

Provided is an electronic device including a hinge module capable of stably implementing the folding or unfolding of housings.

According to an aspect of the disclosure, an electronic device includes: a first housing; a second housing; a display accommodated in the first housing and the second housing; and a hinge module connecting the first housing and the second housing, wherein the hinge module includes: a rotating structure including: a first rotating member connected with the first housing; a second rotating member connected with the second housing; and a rotating bracket accommodating the first rotating member and the second rotating member; and an interlocking structure including: a first spiral rotating member connected with the first housing; a second spiral rotating member connected with the second housing; a first guide member connected with the first housing and surrounding at least a portion of the first spiral rotating member; a second guide member connected with the second housing and surrounding at least a portion of the second spiral rotating member; and a slide member comprising a first through hole for accommodating at least a portion of the first spiral rotating member and a second through hole for accommodating at least a portion of the second spiral rotating member, wherein the slide member is configured to slide based on a motion of the first spiral rotating member or a motion of the second spiral rotating member.

The slide member may also include a first surface forming at least a portion of the first through hole, a second surface forming at least a portion of the first through hole and substantially parallel to the first surface, a third surface forming at least a portion of the second through hole, and a fourth surface forming at least a portion of the second through hole and substantially parallel to the third surface.

The rotating bracket may also include: a first rotating space for accommodating the first rotating member and providing a first rotational axis and a second rotating space for accommodating the second rotating member and providing a second rotational axis substantially parallel to the first rotational axis.

The slide member may also include: a first area comprising a first outer surface spaced apart from the first rotational axis by a first distance and a first inner surface spaced apart from the first rotational axis by a second distance shorter than the first distance; and a second area comprising a second outer surface spaced apart from the second rotational axis by the first distance and a second inner surface spaced apart from the second rotational axis by the second distance.

The hinge module may also include: a fixing structure including: a first detent member connected to the first housing and facing at least a portion of the slide member and at least a portion of the first guide member; and a second detent member connected to the second housing and facing at least a portion of the slide member and at least a portion of the second guide member.

The first detent member may also include: at least one first cam structure configured to provide a frictional force to the slide member; at least one first resilient member configured to provide an elastic force to the at least one first cam structure; and a first detent bracket connected with the at least one first cam structure; and the second detent member may also include: at least one second cam structure configured to provide a frictional force to the slide member; at least one second resilient member configured to provide an elastic force to the at least one second cam structure; and a second detent bracket connected with the at least one second cam structure.

The slide member may also include: at least one third cam structure configured to contact the at least one first cam structure; and at least one fourth cam structure configured to contact the at least one second cam structure.

The first spiral rotating member may include: a first bracket connected with the first housing; and a first spiral rotating bracket extending from the first bracket and configured to rotate in the first through hole, and the second spiral rotating member may include: a second bracket connected with the second housing; and a second spiral rotating bracket extending from the second bracket and configured to rotate in the second through hole.

The first spiral rotating bracket may include: a first spiral rotating rail facing the first guide member; and a first protruding area extending from the first spiral rotating rail, and the second spiral rotating bracket may include: a second spiral rotating rail facing the second guide member; and a second protruding area extending from the second spiral rotating rail.

The first spiral rotating bracket may be disposed between the first guide member and the slide member, and the second spiral rotating bracket may be disposed between the second guide member and the slide member.

The electronic device may also include a hinge cover connected to the rotating structure and configured to guide a movement of the slide member.

The hinge cover may include an accommodating recess for accommodating the slide member.

The slide member may include a first recess for guiding rotation of the first guide member and a second recess for guiding rotation of the second guide member, the first guide member may include at least one first protrusion facing the first rotating member, and the second guide member may include at least one second protrusion facing the second rotating member, and the first guide member may be accommodated in the first recess and the second guide member may be accommodated in the second recess.

A distance between the slide member and the rotating structure may be configured to vary based on an angle between the first housing and the second housing.

At least a portion of the first spiral rotating member may be configured to rotate with respect to the slide member together with the first guide member, and at least a portion of the second spiral rotating member may be configured to rotate with respect to the slide member together with the second guide member.

According to an aspect of the disclosure, a hinge device includes: a rotating structure including: a first rotating member configured to connect to a first surface; a second rotating member configured to connect to a second surface; and a rotating bracket accommodating the first rotating member and the second rotating member; and an interlocking structure including: a first spiral rotating member configured to connect to the first surface; a second spiral rotating member configured to connect to the second surface; a first guide member surrounding at least a portion of the first spiral rotating member and configured to connect with the first surface, wherein the first guide member comprises at least one first protrusion facing the first rotating member; a second guide member surrounding at least a portion of the second spiral rotating member and configured to connect with the second surface, wherein the second guide member comprises at least one second protrusion facing the second rotating member; and a slide member including: a first through hole for accommodating at least a portion of the first spiral rotating member; a second through hole for accommodating at least a portion of the second spiral rotating member, a first recess for guiding rotation of the first guide member; and a second recess for guiding rotation of the second guide member, wherein the first guide member is accommodated in the first recess and the second guide member is accommodated in the second recess, and the slide member is configured to slide based on a motion of the first spiral rotating member or a motion of the second spiral rotating member.

The hinge device may also include: a fixing structure including: a first detent member configured to connect to the first surface and facing at least a portion of the slide member and at least a portion of the first guide member; and a second detent member configured to connect to the second surface and facing at least a portion of the slide member and at least a portion of the second guide member.

The first spiral rotating member may include: a first bracket configured to connect with the first surface; and a first spiral rotating bracket extending from the first bracket and configured to rotate in the first through hole, and the second spiral rotating member may include: a second bracket configured to connect with the second surface; and a second spiral rotating bracket extending from the second bracket and configured to rotate in the second through hole.

According to an aspect of the disclosure, an electronic device includes: a first housing; a second housing; a display accommodated in the first housing and the second housing; and a hinge module connecting the first housing and the second housing, wherein the hinge module includes: an interlocking structure including: a first spiral rotating member connected with the first housing; a second spiral rotating member connected with the second housing; a first guide member connected with the first housing and surrounding at least a portion of the first spiral rotating member; a second guide member connected with the second housing and surrounding at least a portion of the second spiral rotating member; and a slide member including a first through hole for accommodating at least a portion of the first spiral rotating member and a second through hole for accommodating at least a portion of the second spiral rotating member, wherein the slide member is configured to slide based on a motion of the first spiral rotating member or a motion of the second spiral rotating member.

The hinge module may also include: a fixing structure including: a first detent member connected to the first housing and facing at least a portion of the slide member and at least a portion of the first guide member; and a second detent member connected to the second housing and facing at least a portion of the slide member and at least a portion of the second guide member.

The hinge module of the electronic device according to various embodiments of the disclosure may enable the pair of housings to interlock with each other using the interlocking structure which includes a slide member and a spiral rotating member in surface contact with the slide member. As the slide member and the spiral rotating member come in surface contact with each other, the loss of force transferred between the spiral rotating member and the slide member may decrease. As the loss of the transferred force decreases, the length and/or thickness of the interlocking structure required may reduce.

The hinge module of the electronic device according to various embodiments of the disclosure may reduce escape of the spiral rotating member off the slide member using a guide member that rotates together with the spiral rotating member and surrounds the spiral rotating member.

According to various embodiments of the disclosure, the electronic device may stably maintain the unfolded state at the user's desired angle or a designated angle using the fixing structure capable of providing frictional force to the slide member.

The disclosure is not limited to the foregoing embodiments but various modifications or changes may rather be made thereto without departing from the spirit and scope of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
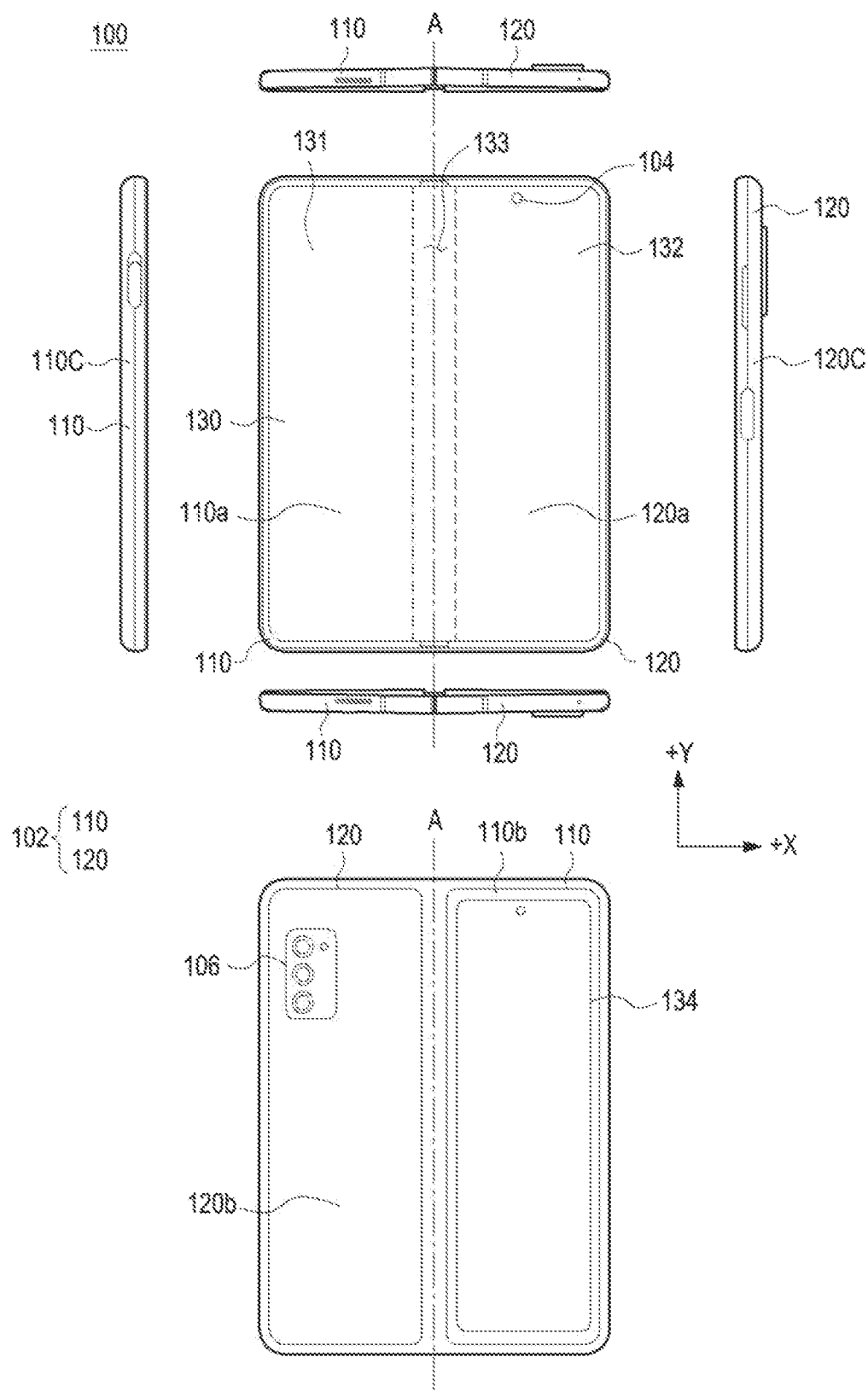
FIG. 1 is a view illustrating an unfolded state of an electronic device according to various embodiments of the disclosure.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
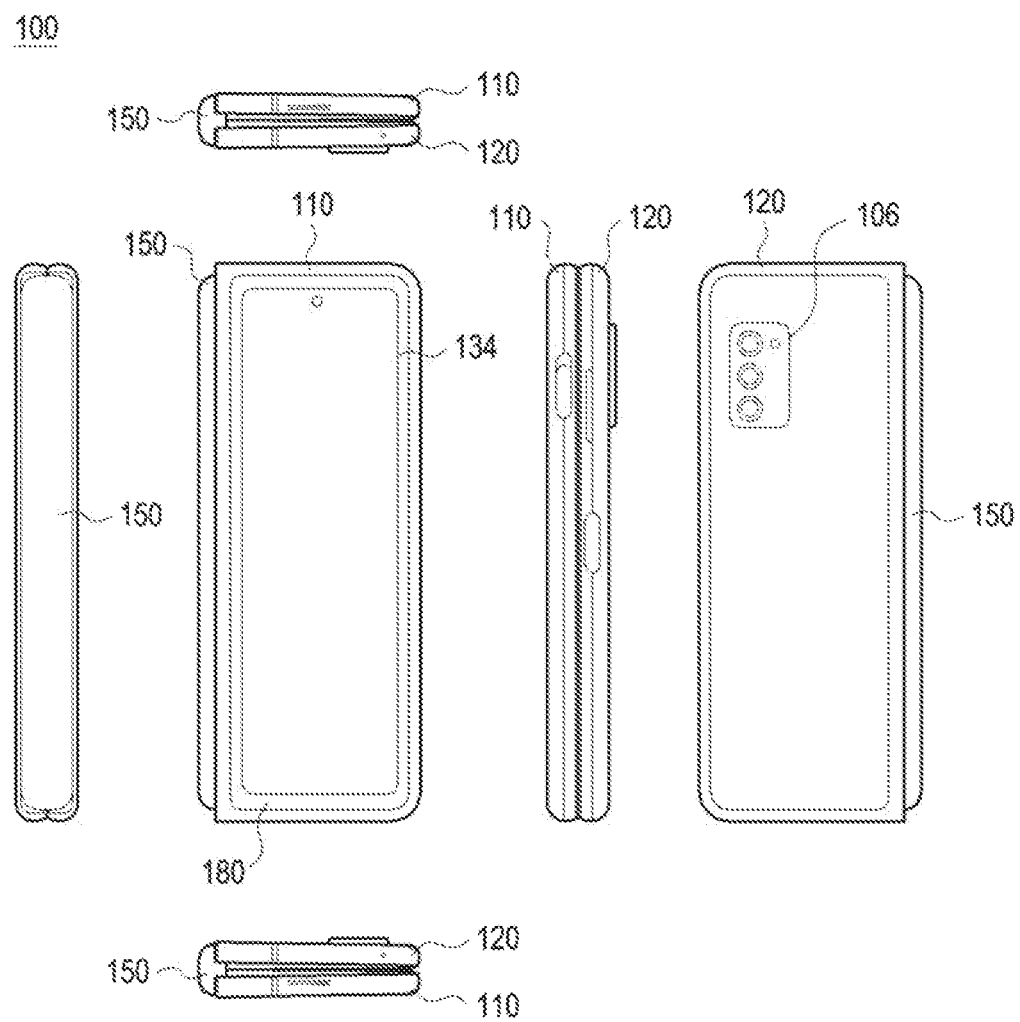
FIG. 2 is a view illustrating a folded state of an electronic device according to various embodiments of the disclosure.

FIG. 1 is a view illustrating an unfolded state of an electronic device according to various embodiments of the disclosure. FIG. 2 is a view illustrating a folded state of an electronic device according to various embodiments of the disclosure.

Referring to FIGS. 1 and 2, an electronic device 100 may include a foldable housing 102 (hereinafter, simply referred to as a housing 102) for accommodating components (e.g., the hinge module 140) of the electronic device 100 and a flexible or foldable display 130 (hereinafter, simply referred to as a "display" 130) disposed in a space formed by the housing 102.

According to various embodiments, the housing 102 may include a first housing 110, a second housing 120, and a hinge cover 150.

According to various embodiments, the first housing 110 and/or the second housing 120 may form a portion of the exterior of the electronic device 100. According to an embodiment, the surface where the display 130 is visually exposed is defined as a front surface (e.g., a first front surface 110a and a second front surface 120a) of the electronic device 100 and/or housing 102. A surface opposite to the front surface is defined as a rear surface (e.g., a first rear surface 110b and a second rear surface 120b) of the electronic device 100. Further, a surface surrounding at least a portion of the space between the front surface and the rear surface is defined as a side surface (e.g., the first side surface 110c and the second side surface 120c) of the electronic device 100.

Figure 3:
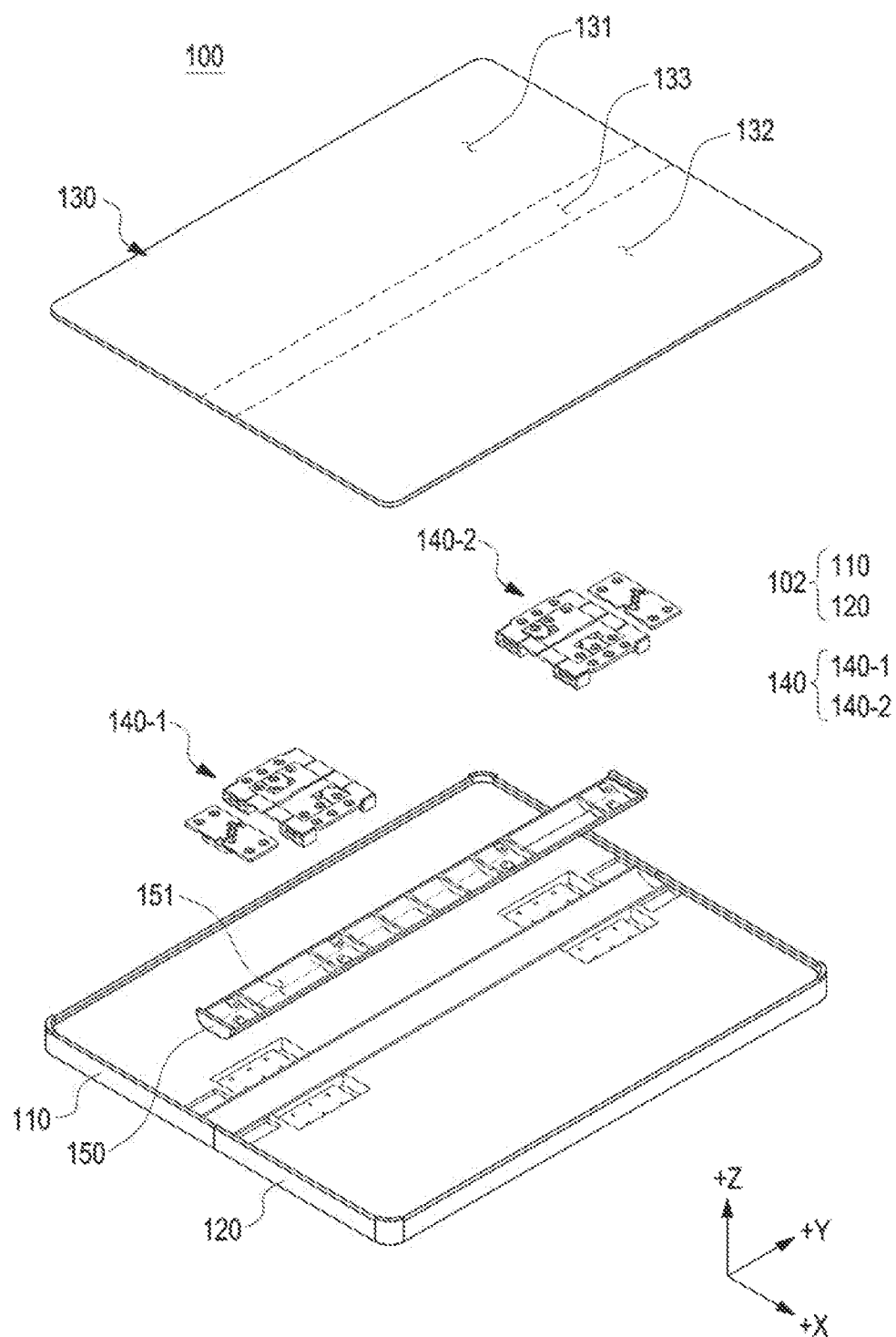
FIG. 3 is a perspective view illustrating an electronic device according to various embodiments of the disclosure.

According to various embodiments, the first housing 110 may be rotated about the second housing 120 by a hinge module (e.g., the hinge module 140 of FIG. 3). Thus, the electronic device 100 may turn into a folded state (e.g., FIG. 2) or unfolded state (e.g., FIG. 1). In the folded state of the electronic device 100, the first front surface 110a may face the second front surface 120a, and in the unfolded state, the direction in which the first front surface 110a faces may be the same as the direction in which the second front surface 120a faces. For example, in the unfolded state, the first front surface 110a may be positioned on substantially the same plane as the second front surface 120a.

According to various embodiments, the first housing 110 and the second housing 120 are disposed on both sides of the folding axis A and be overall symmetrical in shape with respect to the folding axis A. As described below, the angle between the first housing 110 and the second housing 120 may be changed depending on whether the electronic device 100 is in the unfolded state, the folded state, or an intermediate state between the unfolded state and the folded state. According to an embodiment, the folding axis A may be a virtual axis positioned between (e.g., in the middle) between a first rotational axis (e.g., the first rotational axis Ax1 of FIG. 4) and a second rotational axis (e.g., the second rotational axis Ax2 of FIG. 4).

According to various embodiments, the hinge cover 150 may be disposed between the first housing 110 and the second housing 120. According to an embodiment, the hinge cover 150 may be hidden by a portion of the first housing 110 and second housing 120 or be exposed to the outside depending on the state of the electronic device 100. According to an embodiment, the hinge cover 150 may protect the hinge module 140 from an external impact of the electronic device 100.

According to an embodiment, as shown in FIG. 1, in the unfolded state of the electronic device 100, the hinge cover 150 may be hidden, and thus not exposed, by the first housing 110 and the second housing 120. As another example, as shown in FIG. 2, in the folded state (e.g., a fully folded state) of the electronic device 100, the hinge cover 150 may be exposed to the outside between the first housing 110 and the second housing 120. As another example, in an intermediate state in which the first housing 110 and the second housing 120 are folded with a certain angle, the hinge cover 150 may be partially exposed to the outside between the first housing 110 and the second housing 120. In this case, however, the exposed area may be smaller than in the fully folded state. According to an embodiment, the hinge cover 150 may include a curved surface.

According to various embodiments, the display 130 may mean a display at least a portion of which may be transformed into a flat or curved surface. According to an embodiment, the display 130 may include a folding area 133, a first display area 131 disposed on one side of the folding area 133 (e.g., the left side of the folding area 133 of FIG. 1), and a second display area 132 disposed on the opposite side of the folding area 133 (e.g., the right side of the folding area 203 of FIG. 1). According to an embodiment, the folding area 133 may be formed over the hinge module (e.g., the hinge module 140 of FIG. 3). According to an embodiment, the first display area 131 may be disposed on the first housing 110, and the second display area 132 may be disposed on the second housing 120. According to an embodiment, the display 130 may be accommodated in the first housing 110 and the second housing 120.

However, the segmentation of the display 130 as shown in FIG. 1 is merely an example, and the display 130 may be divided into a plurality of (e.g., four or more, or two) areas depending on the structure or function of the display 130. For example, in the embodiment illustrated in FIG. 1, the display 130 may be divided into the areas by the folding area 133 or folding axis (axis A) extending in parallel with the Y axis but, in another embodiment, the display 130 may be divided into the areas with respect to another folding area (e.g., a folding area parallel with the X axis) or another folding axis (e.g., a folding axis parallel with the X axis). According to an embodiment, the display 130 may be coupled with or disposed adjacent to a touch detection circuit, a pressure sensor capable of measuring the strength (pressure) of touches, and/or a digitizer for detecting a magnetic field-type stylus pen.

According to various embodiments, the electronic device 100 may include a rear display 134. The rear display 134 may be disposed to face in a different direction from the display 130. For example, the display 130 may be visually exposed through the front surface (e.g., the first front surface 110a and/or the second front surface 120a) of the electronic device 100, and the rear display 134 may be visually exposed through the rear surface (e.g., the first rear surface 110b) of the electronic device 100.

According to various embodiments, the electronic device 100 may include at least one camera 104 and 106. According to an embodiment, the electronic device 100 may include a front camera 104 exposed through the front surface (e.g., the second front surface 120a) and/or a rear camera 106 exposed through the rear surface (e.g., the second rear surface 120b). The cameras 104 and 106 may include one or more lenses, an image sensor, a flash, and/or an image signal processor. The flash may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 100.

Figure 4:
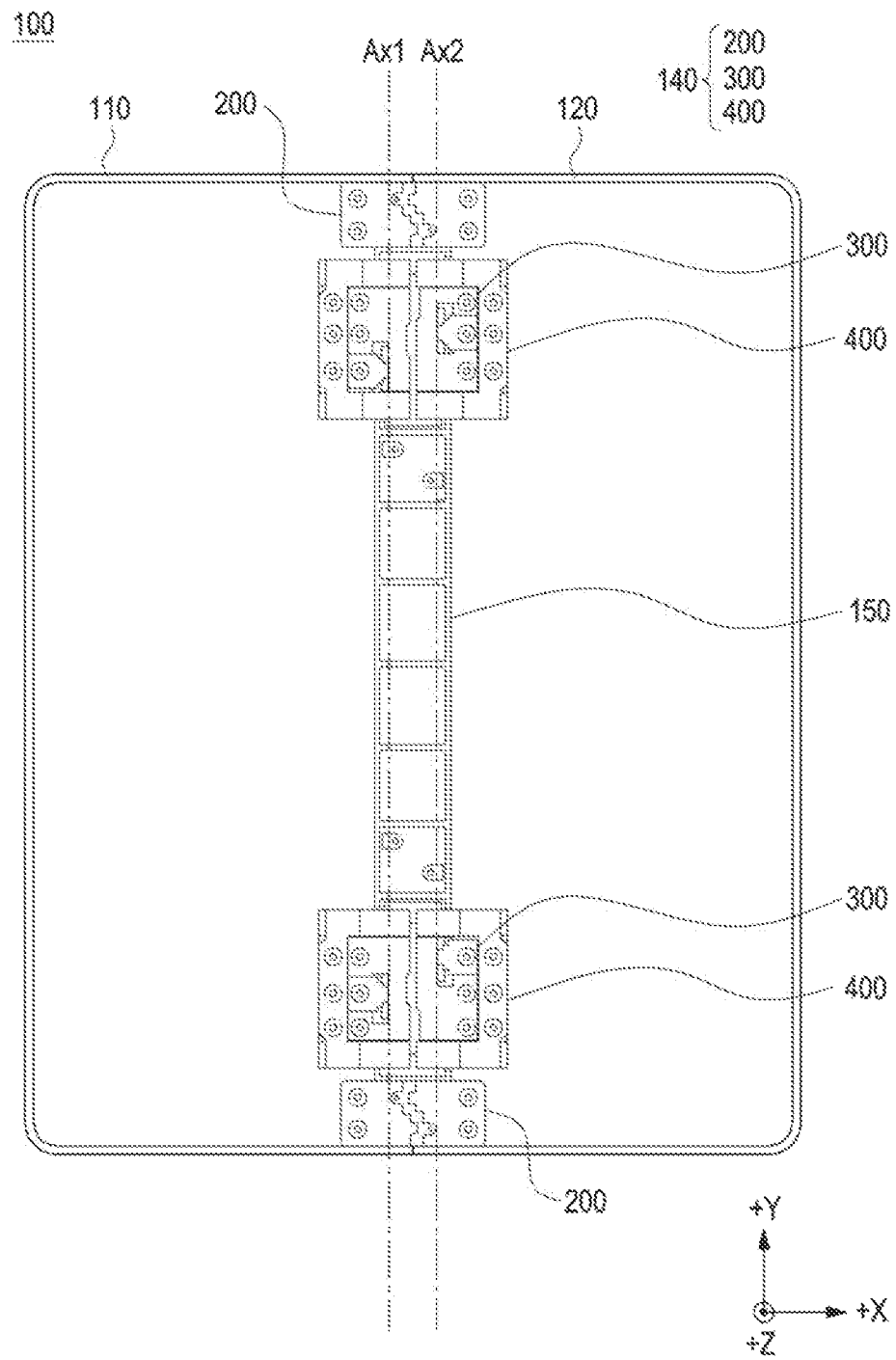
FIG. 4 is a view illustrating a connected structure of a first housing and a second housing in an electronic device according to various embodiments of the disclosure.

FIG. 3 is a perspective view illustrating an electronic device according to various embodiments of the disclosure. FIG. 4 is a view illustrating a connected structure of a first housing and a second housing in an electronic device according to various embodiments of the disclosure.

Referring to FIGS. 3 and 4, the electronic device 100 may include at least one hinge module 140 connecting the first housing 110 and the second housing 120. The configuration of the first housing 110, the second housing 120, the display 130, and the hinge cover 150 of FIGS. 3 and 4 may be identical in whole or part to the configuration of the first housing 110, the second housing 120, the display 130, and the hinge cover 150 of FIGS. 1 and 2.

According to various embodiments, the first housing 110 and/or the second housing 120 may support components (e.g., the display 130, the hinge module 140, and the battery) of the electronic device 100.

According to various embodiments, the hinge module 140 may rotatably couple the second housing 120 to the first housing 110. According to an embodiment, the first housing 110 and/or the first display area 131 may rotate about the first rotational axis Ax1, and the second housing 120 and/or second display area 132 may rotate about the second rotational axis Ax2. For example, the electronic device 100 may fold, allowing the first display area 131 and the second display area 132 to face each other. In the folded state, the electronic device 100 may be unfolded up to a designated angle. Here, the "designated angle" may mean 180 degrees. According to an embodiment, the hinge module 140 may be disposed between the housing 102 and the display 130. According to an embodiment, the second rotational axis Ax2 may be disposed substantially parallel to the first rotational axis Ax1.

According to various embodiments, the hinge module 140 may include a rotating structure 200, an interlocking structure 300 and/or a fixing structure 400.

According to various embodiments, the rotating structure 200 may substantially implement or guide rotation of the first housing 110 and/or the second housing 120. For example, the rotating structure 200 may provide a first rotational axis Ax1 and a second rotational axis Ax2 formed in a recess (e.g., the first rotating space 231 and the second rotating space 232). According to an embodiment, the rotating structure 200 may be connected with the first housing 110 and the second housing 120. For example, the first rotating member (e.g., the first rotating member 210 of FIG. 5A) of the rotating structure 200 may be connected to or coupled to the first housing 110. The second rotating member (e.g., the second rotating member 220 of FIG. 5A) may be connected or coupled to the second housing 120.

According to various embodiments, the interlocking structure 300 may interlock the rotation of the first housing 110 with the rotation of the second housing 120. The interlocking structure 300 may transfer at least a portion of the force applied to the first housing 110 to the second housing 120 or transfer at least a portion of the force applied to the second housing 120 to the first housing 110. For example, the interlocking structure 300 may rotate the second housing 120 at substantially the same angle as the angle at which the first housing 110 is rotated, using a spiral rotating member (e.g., the first spiral rotating member 310 or second spiral rotating member 320 of FIG. 5A). According to an embodiment, the interlocking structure 300 may be connected with the first housing 110 and the second housing 120. For example, the first spiral rotating member (e.g., the first spiral rotating member 310 of FIG. 5A) of the interlocking structure 300 may be connected or coupled to the first housing 110. The second spiral rotating member (e.g., the second spiral rotating member 320 of FIG. 5A) may be connected or coupled to the second housing 120.

According to various embodiments, the fixing structure 400 may position the first housing 110 and the second housing 120 at a certain angle. For example, the fixing structure 400 may provide pressure to the interlocking structure 300 to prevent or reduce movement and/or rotation of the first housing 110 and/or the second housing 120 of the electronic device 100. For example, when the user applies a predetermined degree or more of external force, the hinge module 140 may allow the first housing 110 and/or the second housing 120 to rotate, and if no or less than the predetermined degree of external force is applied, the hinge module 140 may keep the first housing 110 and/or the second housing 120 stationary using the first fixing structure 400. According to an embodiment, the fixing structure 400 may be connected with the first housing 110 and the second housing 120. For example, a first detent member (e.g., the first detent member 410 of FIG. 14A) of the fixing structure 400 may be connected or coupled with the first housing 110. A second detent member (e.g., the second detent member 420 of FIG. 14B) may be connected or coupled with the second housing 120.

According to various embodiments, there may be provided a plurality of hinge modules 140. For example, the hinge module 140 may include a first hinge module 140-1 and a second hinge module 140 spaced apart in the length direction (e.g., the Y-axis direction) from the first hinge module 140-1.

According to various embodiments, the hinge cover 150 may accommodate at least a portion of at least one hinge module 140. For example, the hinge cover 150 may include an accommodating recess 151 for accommodating a slide member (e.g., the slide member 350 of FIG. 5A) of the hinge module 140. According to an embodiment, in the unfolded state of the electronic device 100, at least a portion of the hinge cover 150 may be positioned between the hinge module 140 and the housing 102.

Figure 5A:
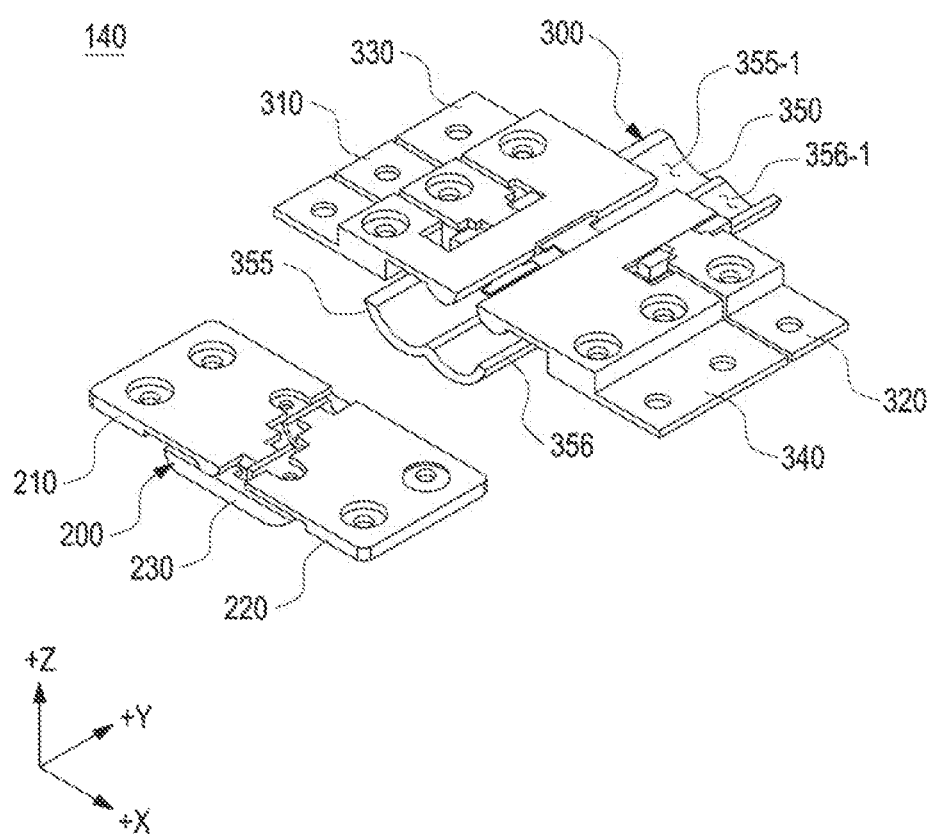
FIG. 5A is a perspective view illustrating a hinge module in an unfolded state according to various embodiments of the disclosure.
Figure 5B:
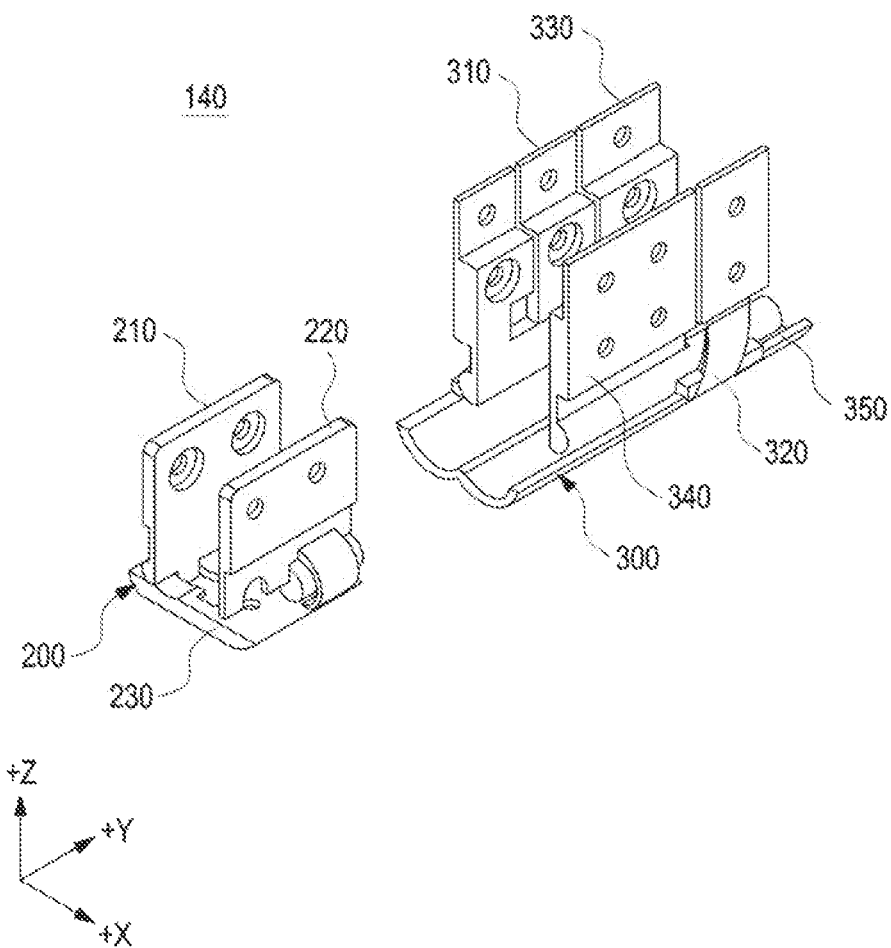
FIG. 5B is a perspective view illustrating a hinge module in a folded state according to various embodiments of the disclosure.
Figure 6A:
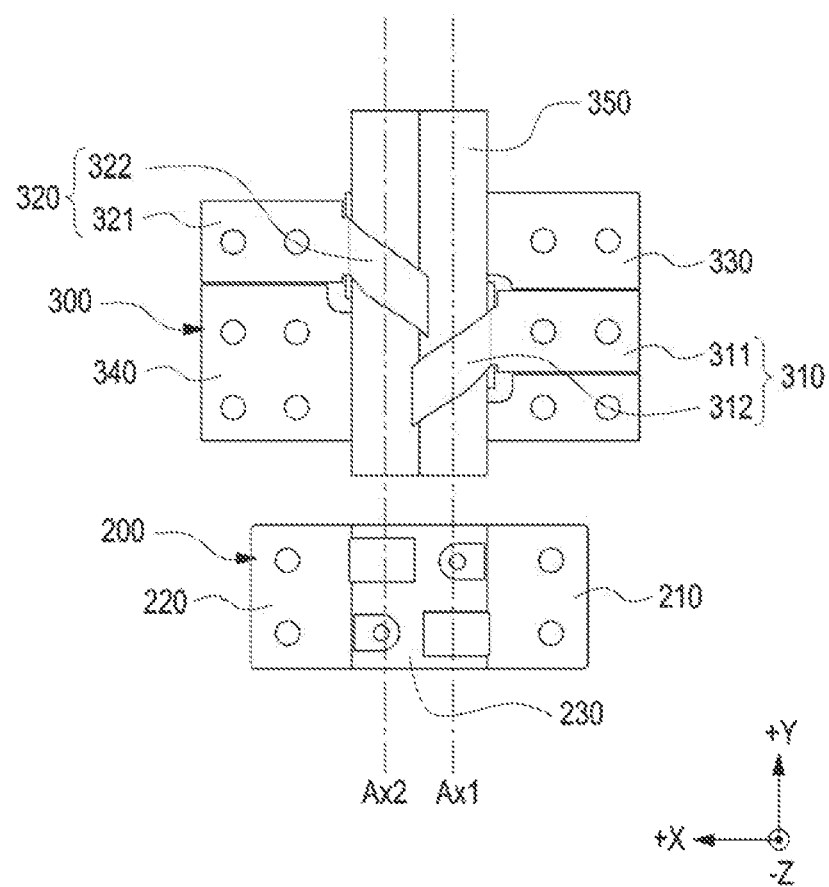
FIG. 6A is a front view illustrating a hinge module in an unfolded state according to various embodiments of the disclosure.
Figure 6B:
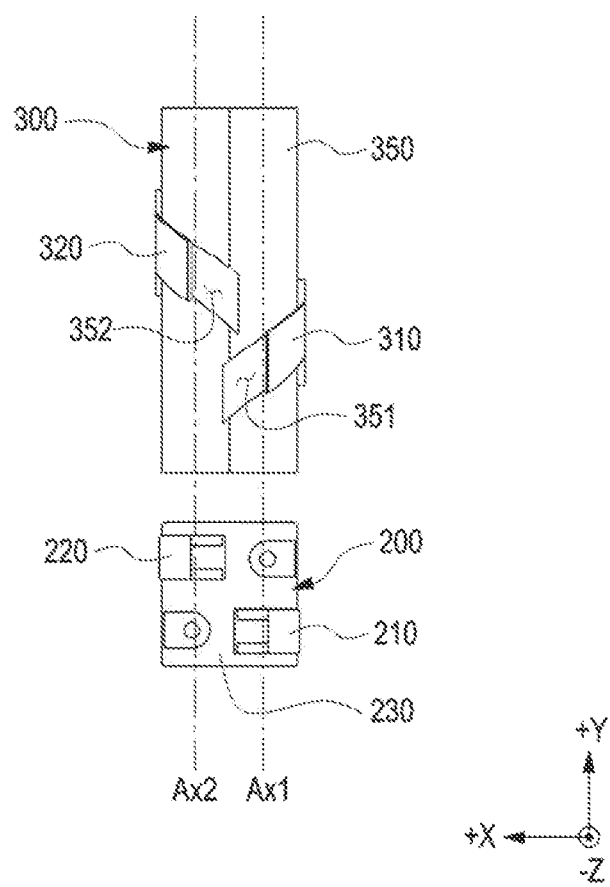
FIG. 6B is a front view illustrating a hinge module in a folded state according to various embodiments of the disclosure.

FIG. 5A is a perspective view illustrating a hinge module in an unfolded state according to various embodiments of the disclosure. FIG. 5B is a perspective view illustrating a hinge module in a folded state according to various embodiments of the disclosure. FIG. 6A is a front view illustrating a hinge module in an unfolded state according to various embodiments of the disclosure. FIG. 6B is a front view illustrating a hinge module in a folded state according to various embodiments of the disclosure.

Referring to FIGS. 5A, 5B, 6A, and 6B, the hinge module 140 may include a plurality of components constituting the rotating structure 200, the interlocking structure 300, and the fixing structure 400. The configuration of the hinge module 140 of FIGS. 5A, 5B, 6A, and 6B may be identical in whole or part to the configuration of the hinge module 140 of FIGS. 3 and 4.

According to various embodiments, the rotating structure 200 may include a first rotating member 210, a second rotating member 220 and a rotating bracket 230. According to an embodiment, the first rotating member 210 may be connected to the first housing (e.g., the first housing 110 of FIG. 4). The second rotating member 220 may be connected to the second housing (e.g., the second housing 120 of FIG. 4). According to an embodiment, the rotating bracket 230 may be disposed in the accommodating recess 151 of the hinge cover 150.

According to various embodiments, the rotating bracket 230 may accommodate the first rotating member 210 and the second rotating member 220. For example, the rotating bracket 230 may include a rotating recess (e.g., the first rotating space 231 of FIG. 7) formed to rotate about the first rotational axis Ax1 and a rotating recess (e.g., the second rotating space 232 of FIG. 7) formed to rotate about the second rotational axis Ax2. According to an embodiment, the first rotating member 210 may be accommodated in the first rotating space 231 and rotate about the first rotational axis Ax1. The second rotating member 220 may be accommodated in the second rotating space 232 and rotate about the second rotational axis Ax2.

According to various embodiments, the interlocking structure 300 may include a first spiral rotating member 310, a second spiral rotating member 320, and a slide member 350. The first spiral rotating member 310 may be connected to or coupled with the first housing (e.g., the first housing 110 of FIG. 4). The second spiral rotating member 320 may be connected to or coupled with the second housing (e.g., the second housing 120 of FIG. 4). For example, the first spiral rotating member 310, along with the first housing 110, may rotate about the first rotational axis Ax1. The second spiral rotating member 320, along with the second housing 120, may rotate about the second rotational axis Ax2. According to an embodiment, the slide member 350 may not be directly coupled to the first housing 110 and/or the second housing 120.

According to various embodiments, the slide member 350 may accommodate the first spiral rotating member 310 and the second spiral rotating member 320. According to an embodiment, the slide member 350 may include a first through hole 351 for accommodating at least a portion of the first spiral rotating member 310 and a second through hole 352 for accommodating at least a portion of the second spiral rotating member 320.

According to various embodiments, the first spiral rotating member 310 may include a first bracket 311 connected with the first housing (e.g., the first housing 110 of FIG. 4) and a first spiral rotating bracket 312 extending from the first bracket 311 and configured to rotate in the first through hole 351. For example, in the unfolded state (e.g., FIG. 6A) of the hinge module 140, the first spiral rotating bracket 312 may be positioned in the first through hole 351 and, in the folded state (e.g., FIG. 6B) of the hinge module 140, at least a portion of the first spiral rotating bracket 312 may be exposed to the outside of the first through hole 351.

According to various embodiments, the second spiral rotating member 320 may include a second bracket 321 connected with the second housing (e.g., the second housing 120 of FIG. 4) and a second spiral rotating bracket 322 extending from the second bracket 321 and configured to rotate in the second through hole 352. For example, in the unfolded state (e.g., FIG. 6A) of the hinge module 140, the second spiral rotating bracket 322 may be positioned in the second through hole 352 and, in the folded state (e.g., FIG. 6B) of the hinge module 140, at least a portion of the second spiral rotating bracket 322 may be exposed to the outside of the second through hole 352.

According to various embodiments, the interlocking structure 300 may include a first guide member 330 and a second guide member 340. According to an embodiment, the first guide member 330 may be connected to the first housing (e.g., the first housing 110 of FIG. 4). The second guide member 340 may be connected to the second housing (e.g., the second housing 120 of FIG. 4). For example, the first guide member 330, along with the first housing 110, may rotate about the first rotational axis Ax1. The second guide member 340, along with the second housing 120, may rotate about the second rotational axis Ax2.

According to various embodiments, the guide members 330 and 340 may prevent or reduce escape of the spiral rotating members 310 and 320 from the slide member 350. According to an embodiment, the first guide member 330 may surround at least a portion of the first spiral rotating member 310. For example, the first spiral rotating bracket 312 of the first spiral rotating member 310 may be disposed between the first guide member 330 and the slide member 350. According to an embodiment, the second guide member 340 may surround at least a portion of the second spiral rotating member 320. For example, the second spiral rotating bracket 322 of the second spiral rotating member 320 may be disposed between the second guide member 340 and the slide member 350. According to an embodiment, the first spiral rotating member 310, together with the first guide member 330, may rotate about the slide member 350. The second spiral rotating member 320, together with the second guide member 340, may rotate about the slide member 350.

According to various embodiments, the slide member 350 may include a first area 355 facing the first spiral rotating member 310 and the first guide member 330 and a second area 356 facing the second spiral rotating member 320 and the second guide member 340. According to an embodiment, the first area 355 may include the first through hole 351. The second area 356 may include the second through hole 352.

According to various embodiments, the slide member 350 may guide rotation of the first guide member 330 and the second guide member 340. According to an embodiment, the first area 355 of the slide member 350 may include a first recess 355-1 for accommodating the first guide member 330. For example, the first recess 355-1 may be a cylindrical recess formed around the first rotational axis Ax1. According to an embodiment, the second area 356 of the slide member 350 may include a second recess 356-1 for accommodating the second guide member 340. For example, the second recess 356-1 may be a cylindrical recess formed around the second rotational axis Ax2.

According to an embodiment, the guide members 330 and 340 may be omitted. For example, the hinge cover (e.g., the hinge cover 150 of FIG. 3) may guide the slide of the slide member 350 of the hinge module 140. According to an embodiment, the first spiral rotating member 310 and the first guide member 330 may be integrally formed with each other, and the second spiral rotating member 320 and the second guide member 340 may be integrally formed with each other.

According to various embodiments, the interlocking structure 300 may be spaced apart from the rotating structure 200. For example, the interlocking structure 300 may be spaced apart from the rotating structure 200 in a length direction (e.g., Y-axis direction).

Figure 7:
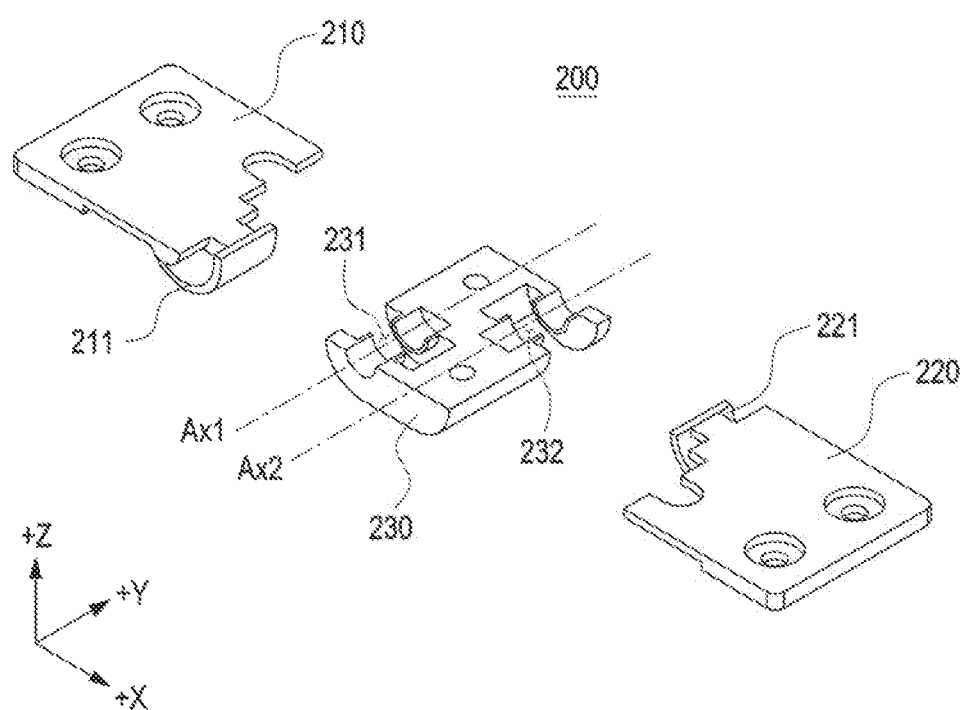
FIG. 7 is an exploded perspective view illustrating a rotating structure according to various embodiments of the disclosure.

FIG. 7 is an exploded perspective view illustrating a rotating structure according to various embodiments of the disclosure.

Referring to FIG. 7, the rotating structure 200 may include a first rotating member 210, a second rotating member 220, and a rotating bracket 230. The configuration of the first rotating member 210, the second rotating member 220, and the rotating bracket 230 of FIG. 7 may be identical in whole or part to the configuration of the first rotating member 210, the second rotating member 220, and the rotating bracket 230 of FIGS. 5A, 5B, 6A, and 6B.

According to various embodiments, the rotating bracket 230 may include a first rotating space 231 and a second rotating space 232 separated from each other. According to an embodiment, the first rotating space 231 may be a space in which the first rotating member 210 is rotatably accommodated or positioned, and the second rotating space 232 may be a space in which the second rotating member 220 is rotatably accommodated or positioned. For example, the first rotating space 231 may accommodate a portion (e.g., the first rotating rail 211) of the first rotating member 210 and may guide rotation of the first rotating member 210. As another example, the second rotating space 232 may accommodate a portion (e.g., the second rotating rail 221) of the second rotating member 220 and may guide rotation of the second rotating member 220. According to an embodiment, the first rotating space 231 may be spaced apart from the first rotational axis Ax1 by a designated distance. The second rotating space 232 may be spaced apart from the second rotational axis Ax2 by a designated distance.

According to various embodiments, the first rotating member 210 may include a first rotating rail 211 extending to form a curved trajectory, and the second rotating member 220 may include a second rotating rail 221 extending to form a curved trajectory. According to an embodiment, the first rotating rail 211 may be inserted in the first rotating space 231, and the second rotating rail 221 may be inserted in the second rotating space 232. According to an embodiment, the center of the radius of curvature of the first rotating rail 211 may be positioned on the first rotational axis Ax1, and the center of the radius of curvature of the second rotating rail 221 may be positioned on the second rotational axis Ax2.

Figure 8:
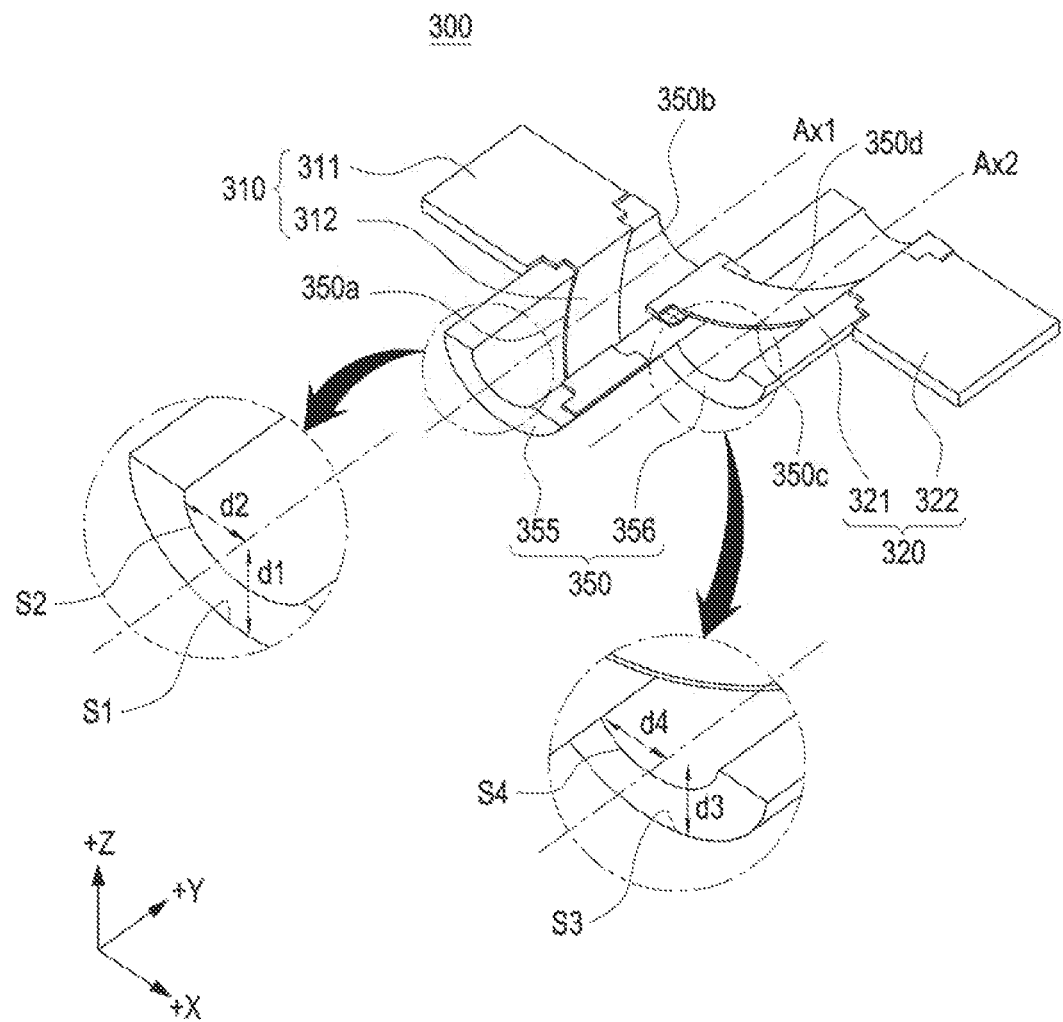
FIG. 8 is a perspective view illustrating an interlocking structure according to various embodiments of the disclosure.

FIG. 8 is a perspective view illustrating an interlocking structure according to various embodiments of the disclosure.

Referring to FIG. 8, the interlocking structure 300 may include a first spiral rotating member 310, a second spiral rotating member 320, and a slide member 350. The configuration of the first spiral rotating member 310, the second spiral rotating member 320, and the slide member 350 of FIG. 8 may be identical in whole or part to the configuration of the first spiral rotating member 310, the second spiral rotating member 320, and the slide member 350 of FIGS. 5A, 5B, 6A, and 6B.

According to various embodiments, the slide member 350 may be formed in a structure for spirally rotating the first spiral rotating member 310 around the first rotational axis Ax1. According to an embodiment, at least a portion (e.g., the first area 355) of the slide member 350 may be a portion of a hollow cylinder shape formed around the first rotational axis Ax1. For example, the slide member 350 may include a first area 355 that includes a first outer surface s1 spaced apart from the first rotational axis Ax1 by a first distance d1 and a first inner surface s2 spaced apart from the first rotational axis Ax1 by a second distance d2 shorter than the first distance d1.

According to various embodiments, the slide member 350 may be formed in a structure for spirally rotating the second spiral rotating member 320 around the second rotational axis Ax2. According to an embodiment, at least a portion (e.g., the second area 356) of the slide member 350 may be a portion of a hollow cylinder shape formed around the second rotational axis Ax2. For example, the slide member 350 may include a second area 356 that includes a second outer surface s3 spaced apart from the second rotational axis Ax2 by a first distance d3 and a second inner surface s42 spaced apart from the second rotational axis Ax2 by a second distance d4 shorter than the first distance d3.

According to various embodiments, the slide member 350 may accommodate the first spiral rotating member 310 and the second spiral rotating member 320. For example, the slide member 350 may include a first through hole (e.g., the first through hole 351 of FIG. 6B) for accommodating the first spiral rotating bracket 312 of the first spiral rotating member 310 and a second through hole (e.g., the second through hole 352 of FIG. 6B) for accommodating the second spiral rotating bracket 322 of the second spiral rotating member 320. The first through hole 351 may be a spiral through hole formed around the first rotational axis Ax1, and the second through hole 352 may be a spiral through hole formed around the second rotational axis Ax2.

According to an embodiment, the first area 355 of the slide member 350 may include a first surface 350a forming at least a portion of the first through hole 351 and a second surface 350b forming at least a portion of the first through hole 351. The second surface 350b may be substantially parallel to the first surface 350a. The first through hole 351 may be a space between the first surface 350a and the second surface 350b. For example, the first through hole 351 may be interpreted as a space surrounded by a virtual surface extending from the first outer surface s1, a virtual surface extending from the first inner surface s2, the first surface 350a, and the second surface 350b.

According to an embodiment, the slide member 350 may include a third surface 350c forming at least a portion of the second through hole 352 and a fourth surface 350d forming at least a portion of the second through hole 352. The third surface 350c may be substantially parallel to the fourth surface 350d. The second through hole 352 may be a space between the third surface 350c and the fourth surface 350d. For example, the second through hole 352 may be interpreted as a space surrounded by a virtual surface extending from the second outer surface s3, a virtual surface extending from the second inner surface s4, the third surface 350c, and the fourth surface 350d.

According to various embodiments, the first spiral rotating member 310 and/or the second spiral rotating member 320 may rotate while being in surface contact with the slide member 350. According to an embodiment, the first spiral rotating member 310 may slide in the first through hole (e.g., the first through hole 351 of FIG. 6B). For example, the first spiral rotating member 310 may rotate about the first rotational axis Ax1 while being in contact with the first surface 350a and/or the second surface 350b. According to an embodiment, the second spiral rotating member 320 may slide in the second through hole (e.g., the second through hole 352 of FIG. 6B). For example, the second spiral rotating member 320 may rotate about the second rotational axis Ax2 while being in contact with the third surface 350c and/or the fourth surface 350d.

Figure 9A:
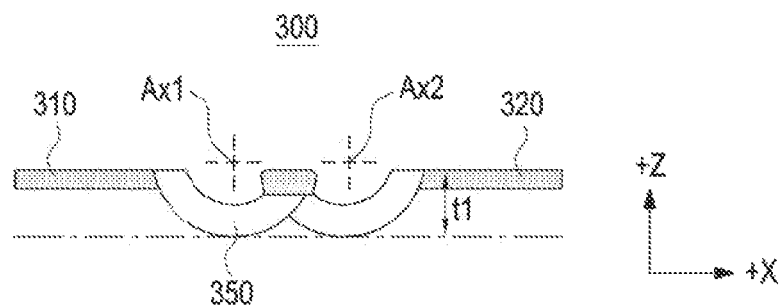
FIGS. 9A, 9B, and 9C are side views illustrating a slide of an interlocking structure according to various embodiments of the disclosure.
Figure 9B:
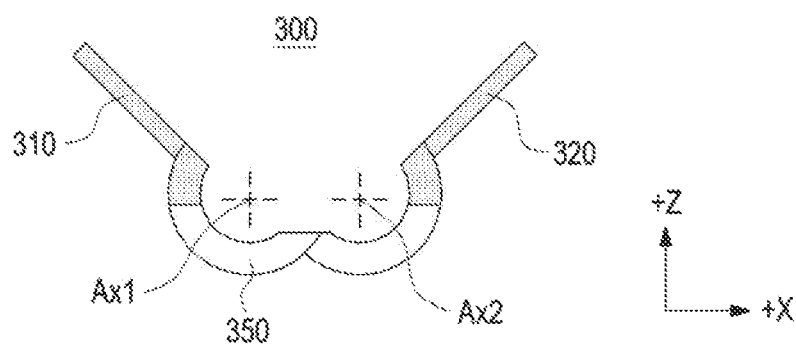
Figure 9C:
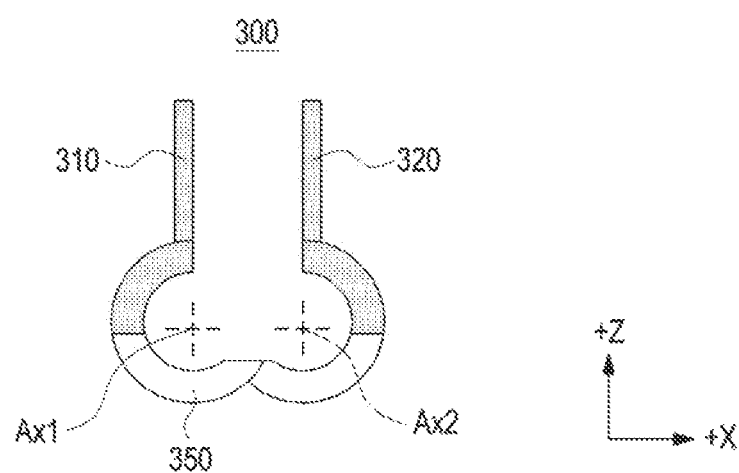
Figure 10A:
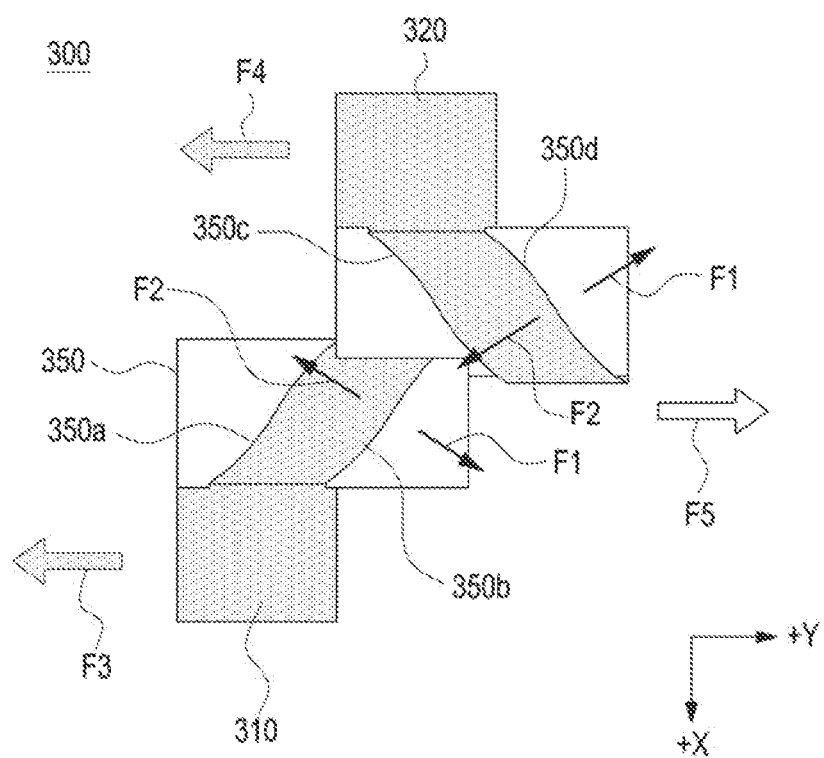
FIGS. 10A, 10B, and 10C are front views illustrating a slide of an interlocking structure according to various embodiments of the disclosure.
Figure 10B:
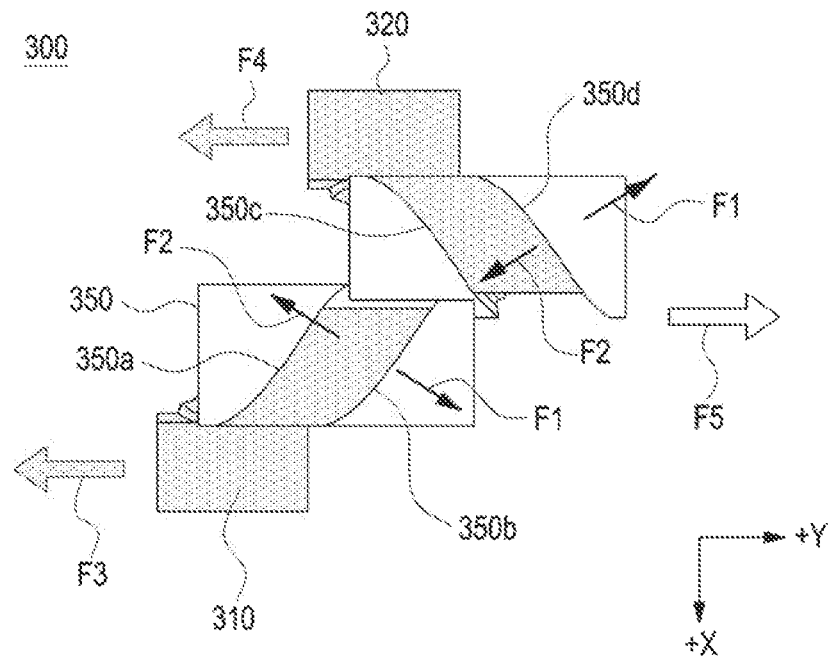
Figure 10C:
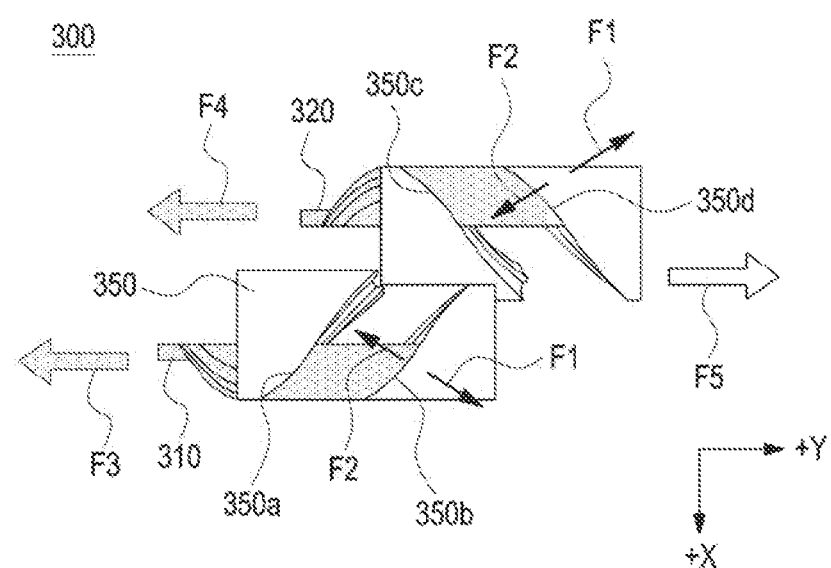

FIGS. 9A, 9B, and 9C are side views illustrating a slide of an interlocking structure according to various embodiments of the disclosure. FIGS. 10A, 10B, and 10C are front views illustrating a slide of an interlocking structure according to various embodiments of the disclosure.

Referring to FIGS. 9A, 9B, 9C, 10A, 10B, and 10C, an interlocking structure 300 may include a first spiral rotating member 310 spirally moving about the first rotational axis Ax1, a second spiral rotating member 320 spirally moving about the second rotational axis Ax2, and a slide member 350 accommodating the first spiral rotating member 310 and/or the second spiral rotating member 320. The configuration of the first spiral rotating member 310, the second spiral rotating member 320, and the slide member 350 of FIGS. 9A, 9B, 9C, 10A, 10B, and 10C may be identical in whole or part to the configuration of the first spiral rotating member 310, the second spiral rotating member 320, and the slide member 350 of FIG. 8.

According to various embodiments, the first spiral rotating member 310, the second spiral rotating member 320, and/or the slide member 350 may perform a spiral interlocking motion. The spiral interlocking motion may be interpreted as a motion in which rotation and linear (slide) motion are mutually converted. For example, when the first spiral rotating member 310 and/or the second spiral rotating member 320 rotates, the first spiral rotating member 310 and/or second spiral rotating member 320 may transfer a first force F1 to the first surface 350a, second surface 350b, third surface 350c, and/or fourth surface 350d of the slide member 350, and the first surface 350a, second surface 350b, third surface 350c, and/or fourth surface 350d of the slide member 350 may transfer a second force F2 to the first spiral rotating member 310 and/or the second spiral rotating member 320. The second force F2 may be a repulsive force of the first force F1. The first force F1 and the second force F2 may be summed and be converted into a third force F3 acting on the first spiral rotating member 310, a fourth force F4 acting on the second spiral rotating member 320, and a fifth force F5 acting on the slide member 350. The sum of the third force F3 and the fourth force F4 may be substantially equal to the magnitude of the fifth force F5.

According to various embodiments, the slide member 350 may slide in the length direction (e.g., the Y-axis direction) of the interlocking structure 300. For example, the slide member 350 may be slid by the force (e.g., the fifth force F5) applied to the slide member 350 as the first spiral rotating member 310 connected to the first housing (e.g., the first housing 110 of FIG. 4) and/or the second spiral rotating member 320 connected to the second housing (e.g., the second housing 120 of FIG. 4) is rotated. As another example, the first spiral rotating member 310 and/or the second spiral rotating member 320 may be rotated by the force (e.g., the second force F2) applied to the first spiral rotating member 310 and/or the second spiral rotating member 320 as the slide member 350 slides (linear motion). According to an embodiment, the distance between the slide member 350 and the rotating structure (e.g., the rotating structure 200 of FIG. 5A) may be varied based on the angle between the first housing (e.g., the first housing 110 of FIG. 1) and the second housing (e.g., the second housing 120 of FIG. 2). For example, as the rotating structure 200 is coupled to the first housing 110 and/or the second housing 120, and the slide member 350 is slid with respect to the first housing 110 and/or the second housing 120, the distance between the rotating structure 200 and the slide member 350 may be varied based on the angle between the first housing 110 and the second housing 120.

According to various embodiments, the slide of the first spiral rotating member 310 and the second spiral rotating member 320 may be reduced or restricted. For example, the first spiral rotating member 310 may be coupled to the first housing (e.g., the first housing 110 of FIG. 4) to restrict or reduce a motion in the length direction (e.g., Y-axis direction) of the first spiral rotating member 310, and the second spiral rotating member 320 may be coupled to the second housing (e.g., the second housing 120 of FIG. 4) to restrict or reduce a motion in the length direction (e.g., Y-axis direction) of the second spiral rotating member 320.

According to various embodiments, the interlocking structure 300 may interlock without a gear by the first spiral rotating member 310, the second spiral rotating member 320, and the slide member 350. The thickness of the interlocking structure 300 may be thinner than the thickness of an interlocking structure including a gear structure. For example, the thickness t1 of the interlocking structure 300 may be 3.0 mm or less.

Figure 11:
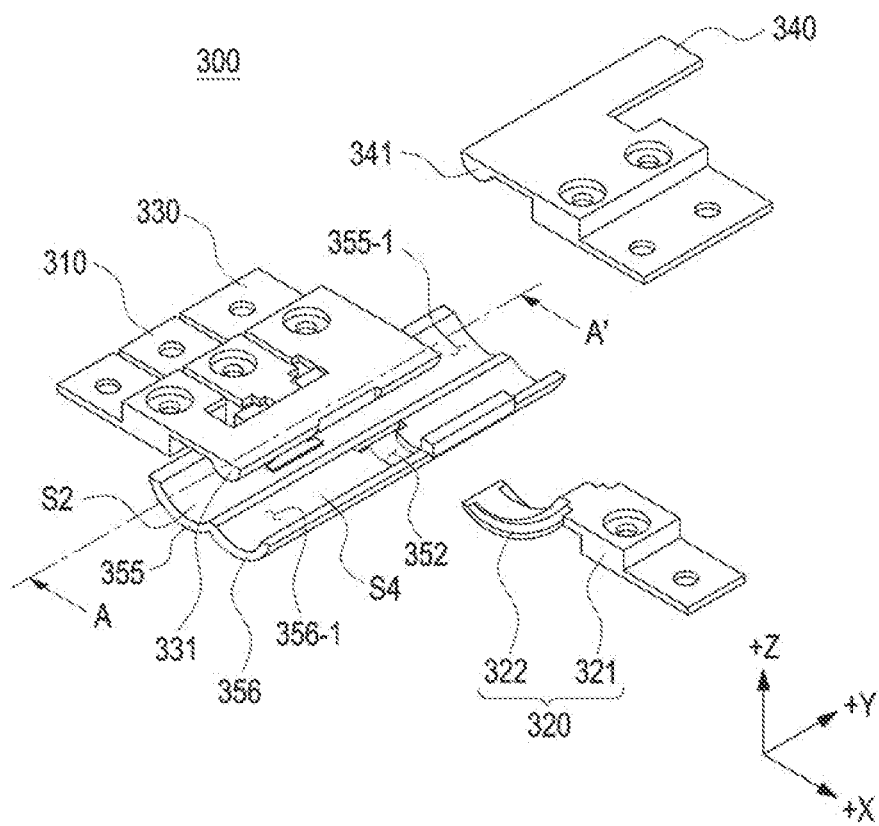
FIG. 11 is an exploded perspective view illustrating an interlocking structure according to various embodiments of the disclosure.
Figure 12:
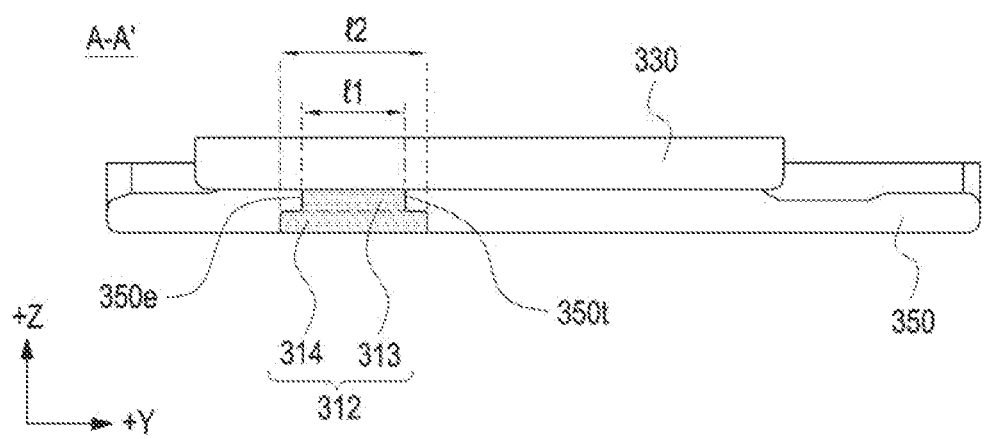
FIG. 12 is a cross-sectional view taken along line A-A' of FIG. 11 according to various embodiments of the disclosure.

FIG. 11 is an exploded perspective view illustrating an interlocking structure according to various embodiments of the disclosure. FIG. 12 is a cross-sectional view taken along line A-A' of FIG. 11 according to various embodiments of the disclosure.

Referring to FIGS. 11 and 12, an interlocking structure 300 may include a first spiral rotating member 310, a second spiral rotating member 320, a first guide member 330, a second guide member 340, and a slide member 350. The configuration of the first spiral rotating member 310, the second spiral rotating member 320, the first guide member 330, the second guide member 340, and the slide member 350 of FIGS. 11 and 12 may be identical in whole or part to the configuration of the first spiral rotating member 310, the second spiral rotating member 320, the first guide member 330, the second guide member 340, and the slide member 350 of FIGS. 5A, 5B, 6A, and 6B.

According to various embodiments, the first guide member 330 and/or the second guide member 340 may rotate together with the first spiral rotating member 310 and/or the second spiral rotating member 320. For example, the first guide member 330, along with the first spiral rotating member 310, may rotate about a first rotational axis (e.g., the first rotational axis Ax1 of FIG. 6A). The second guide member 340, along with the second spiral rotating member 320, may rotate around a second rotational axis (e.g., the second rotational axis Ax2 of FIG. 6A).

According to various embodiments, at least a portion of the first guide member 330 and/or the second guide member 340 may be accommodated in the slide member 350. According to an embodiment, the first guide member 330 may include at least one first protrusion 331 accommodated in a first recess 355-1 formed in the first area 355 of the slide member 350. The first protrusion 331 may face the first inner surface s2 of the slide member 350. According to an embodiment (e.g., FIG. 11), the first protrusion 331 may be positioned on each of two opposite sides of a portion (e.g., the first spiral rotating bracket 312 of FIG. 6A) of the first spiral rotating member 310. According to another embodiment, the first protrusion 331 may be positioned on one side of the first spiral rotating bracket 312. The first recess 355-1 may guide the rotation of the first guide member 330. According to an embodiment, the second guide member 340 may include at least one second protrusion 341 accommodated in the second recess 356-1 formed in the second area 356 of the slide member 350. The second protrusion 341 may face the second inner surface s4 of the slide member 350. According to an embodiment (e.g., FIG. 11), the second protrusion 341 may be positioned on one side of the second spiral rotating bracket 322. According to another embodiment, the second protrusion 341 may be positioned on each of two opposite sides of a portion (e.g., the second spiral rotating bracket 322) of the second spiral rotating member 320. The second recess 356-1 may guide rotation of the second guide member 340.

According to various embodiments, the interlocking structure 300 may be formed as a structure for preventing or reducing escape of the first spiral rotating member 310 or the second spiral rotating member 320 from the slide member 350. For example, the first spiral rotating bracket 312 may include a first spiral rotating rail 313 facing the first guide member 330 and at least one first protruding area 314 extending from the first spiral rotating rail 313. According to an embodiment (e.g., FIG. 12), the first protruding area 314 may protrude in the length direction (e.g., the Y-axis direction) of the interlocking structure 300. For example, the second length 12 of the first protruding area 314 may be longer than the first length 11 of the first spiral rotating rail 313. The first protruding area 314 may face or contact jammed sides 350e and 350t of the slide member 350, preventing escape of the first spiral rotating member 310 from the slide member 350. According to an embodiment, the jammed sides 350e and 350t of the slide member 350 may be positioned between the first protruding area 314 and the first guide member 330. According to an embodiment, the interlocking structure 300 does not include the first guide member 330 and the second guide member 340, and the slide member 350 may slide with respect to a hinge cover (e.g., the hinge cover 150 of FIG. 3). In the interlocking structure 300 that does not include the first guide member 330 and the second guide member 340, the first spiral rotating rail 313 may face the hinge cover 150, and the first protruding area 314 may be positioned above the first spiral rotating rail 313 (e.g., in the +Z direction).

According to various embodiments, the second spiral rotating bracket 322 may include a second spiral rotating rail facing the second guide member 340 and a second protruding area extending from the second spiral rotating rail. The configuration of the second spiral rotating rail and the second protruding area may be identical in whole or part to the configuration of the first spiral rotating rail 313 and the first protruding area 314.

Figure 13:
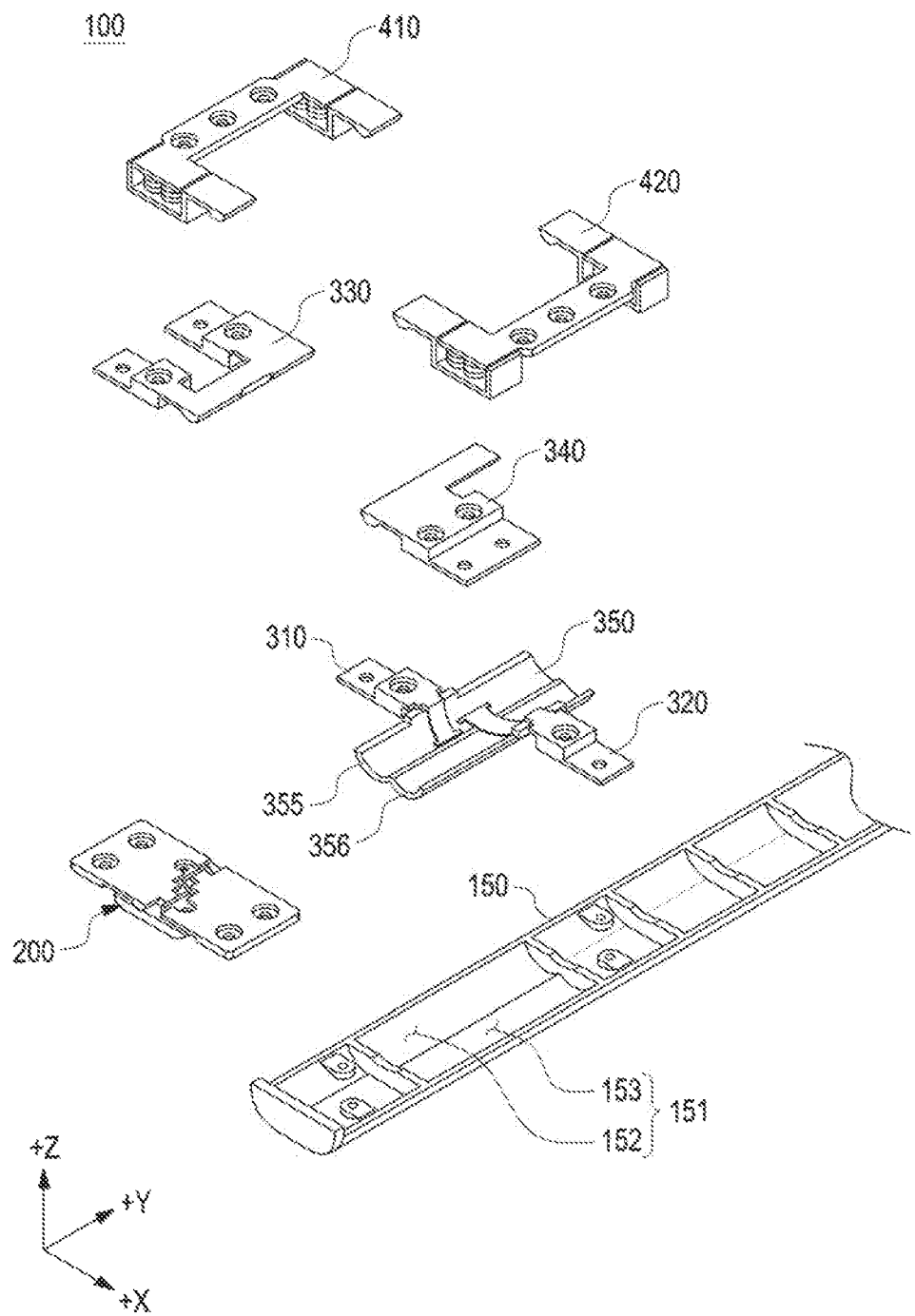
FIG. 13 is an exploded perspective view illustrating a hinge module and a hinge cover according to various embodiments of the disclosure.

FIG. 13 is an exploded perspective view illustrating a hinge module and a hinge cover according to various embodiments of the disclosure.

Referring to FIG. 13, an electronic device 100 may include a hinge module 140 including a rotating structure 200, an interlocking structure 300, a fixing structure 400 and a hinge cover 150. The configuration of the rotating structure 200, interlocking structure 300, fixing structure 400 and hinge cover 150 of FIG. 13 may be identical in whole or part to the configuration of the rotating structure 200, interlocking structure 300, fixing structure 400 and hinge cover 150 of FIG. 4.

According to various embodiments, the hinge cover 150 may guide the movement of the slide member 350. For example, the hinge cover 150 may include an accommodating recess 151 for accommodating the slide member 350. According to an embodiment, the accommodating recess 151 may include a first accommodating recess 152 for accommodating a first area 355 of the slide member 350 and a second accommodating recess 153 for accommodating a second area 356 of the slide member 350. The first accommodating recess 152 and the second accommodating recess 153 may be symmetrical with respect to the length direction (e.g., Y-axis direction) of the electronic device 100. According to an embodiment, the slide member 350 may slide within the accommodating recess 151 of the hinge cover 150.

Figure 14A:
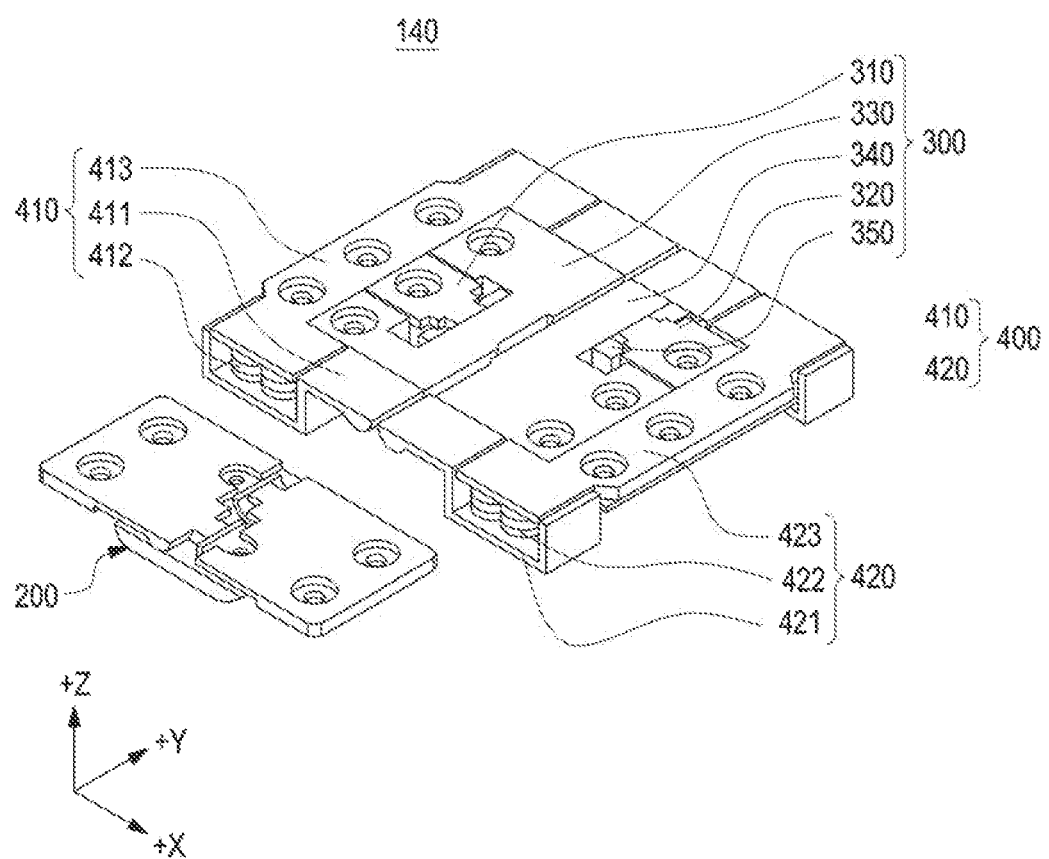
FIG. 14A is a perspective view illustrating a hinge module in an unfolded state including a fixing structure according to various embodiments of the disclosure.
Figure 14B:
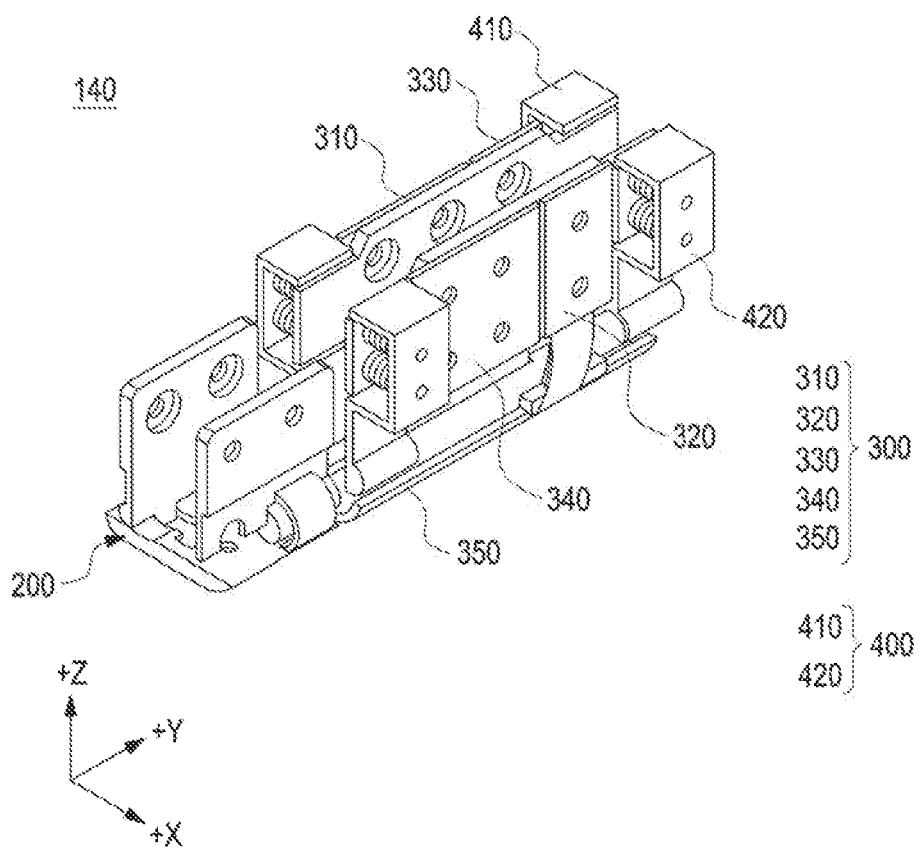
FIG. 14B is a perspective view illustrating a hinge module in a folded state including a fixing structure according to various embodiments of the disclosure.
Figure 15:
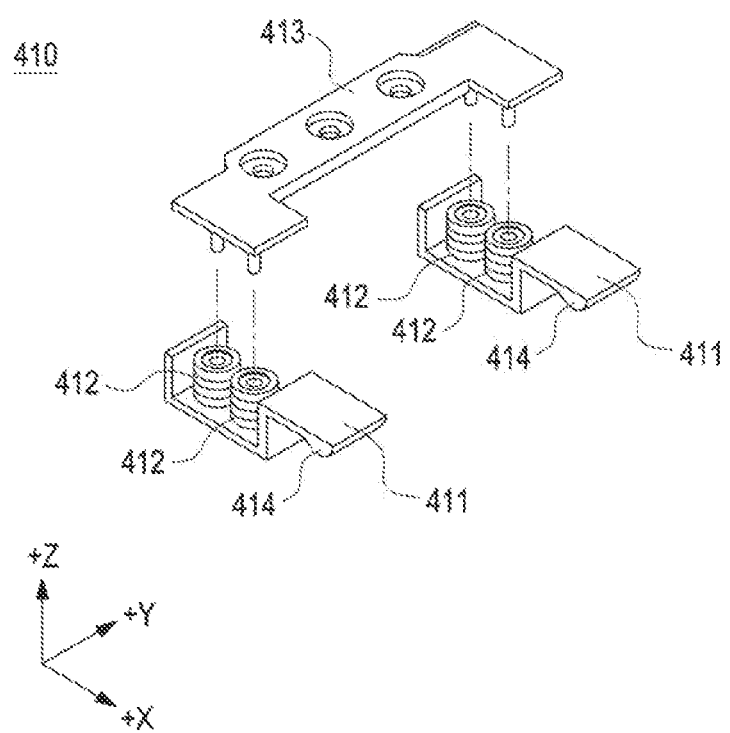
FIG. 15 is an exploded perspective view illustrating a fixing structure according to various embodiments of the disclosure.

FIG. 14A is a perspective view illustrating a hinge module in an unfolded state including a fixing structure according to various embodiments of the disclosure. FIG. 14B is a perspective view illustrating a hinge module in a folded state including a fixing structure according to various embodiments of the disclosure. FIG. 15 is an exploded perspective view illustrating a fixing structure according to various embodiments of the disclosure.

Referring to FIGS. 14A, 14B, and 15, a hinge module 140 may include a rotating structure 200, an interlocking structure 300, and a fixing structure 400. The configuration of the rotating structure 200, interlocking structure 300, and fixing structure 400 of FIGS. 14A, 14B, and 15 may be identical in whole or part to the configuration of the rotating structure 200, the interlocking structure 300, and the fixing structure 400 of FIG. 4.

According to various embodiments, the fixing structure 400 may include a first detent member 410 and a second detent member 420. According to an embodiment, the first detent member 410 may be connected to the first housing (e.g., the first housing 110 of FIG. 4) and may face at least a portion of the slide member 350, at least a portion of the first guide member 330, and/or at least a portion of the first spiral rotating member 310. According to an embodiment, the second detent member 420 may be connected to the second housing (e.g., the second housing 120 of FIG. 4) and may face at least a portion of the slide member 350, at least a portion of the second guide member 340, and/or at least a portion of the second spiral rotating member 320. For example, the first detent member 410 and the second detent member 420 may surround at least a portion of the interlocking structure 300.

According to various embodiments, the first detent member 410 and/or the second detent member 420 may provide pressure to the interlocking structure 300. According to an embodiment, the first detent member 410 may include at least one first cam structure 411, at least one first resilient member 412, and a first detent bracket 413.

According to various embodiments, the first cam structure 411 may provide frictional force to the slide member 350. For example, the first cam structure 411 may contact the slide member 350 to prevent or reduce the slide of the slide member 350.

According to various embodiments, the first resilient member 412 may provide elastic force to the first cam structure 411. For example, the first resilient member 412 may provide elastic force in the thickness direction (e.g., the Z-axis direction of FIG. 15) of the hinge module 140 to allow the first cam structure 411 to contact and face the slide member 350. According to an embodiment, the first resilient member 412 may be disposed between the first cam structure 411 and the first detent bracket 413. According to an embodiment, the first resilient member 412 may be a spring.

According to various embodiments, the first detent bracket 413 may include a first detent bracket 413 connected to at least one first cam structure 411. According to an embodiment, the first detent bracket 413 may be connected to the first housing (e.g., the first housing 110 of FIG. 4). For example, the first detent bracket 413, along with the first housing 110, may rotate around a first rotational axis (e.g., the first rotational axis Ax1 of FIG. 6A).

According to various embodiments, the second detent member 420 may include at least one second cam structure 421, at least one second resilient member 422, and a second detent bracket 423. According to an embodiment, the second detent member 420 is a component symmetrical to the first detent member 410 with respect to the folding axis (e.g., the folding axis A of FIG. 1), and the description of the first detent member 410, the first cam structure 411, the first resilient member 412, and the first detent bracket 413 may be applied to the configuration of the second detent member 420, the second cam structure 421, the second resilient member 422, and the second detent bracket 423.

Figure 16:
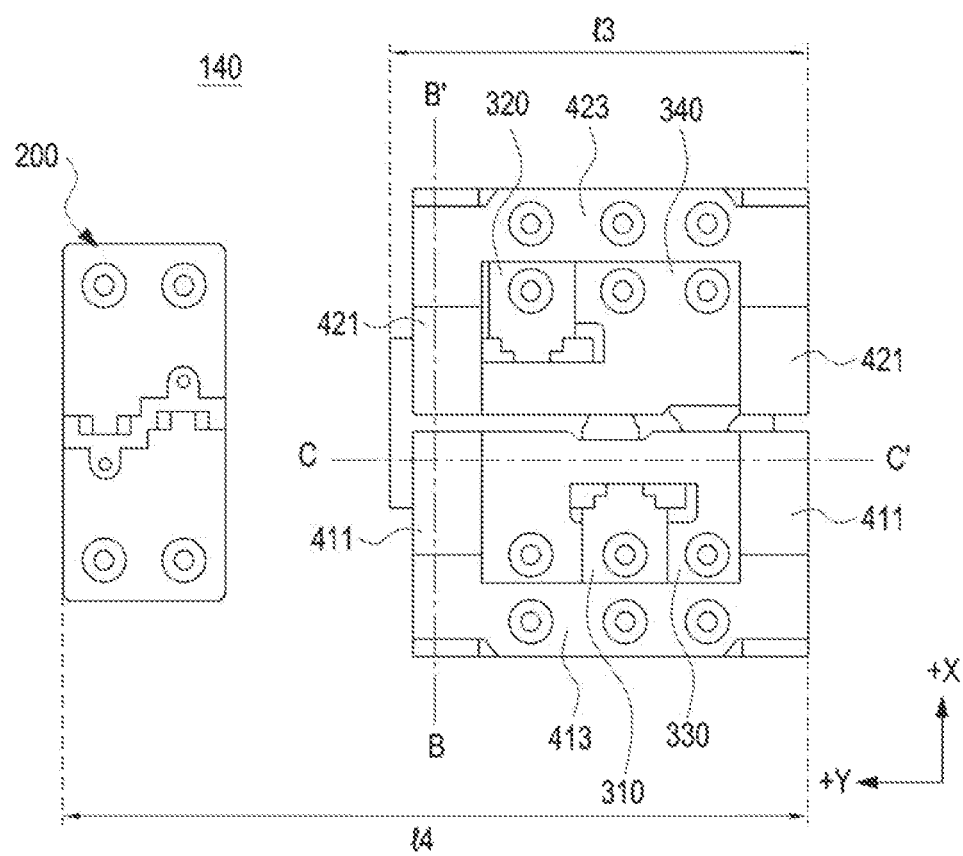
FIG. 16 is a front view illustrating a hinge module including a fixing structure according to various embodiments of the disclosure.
Figure 17:
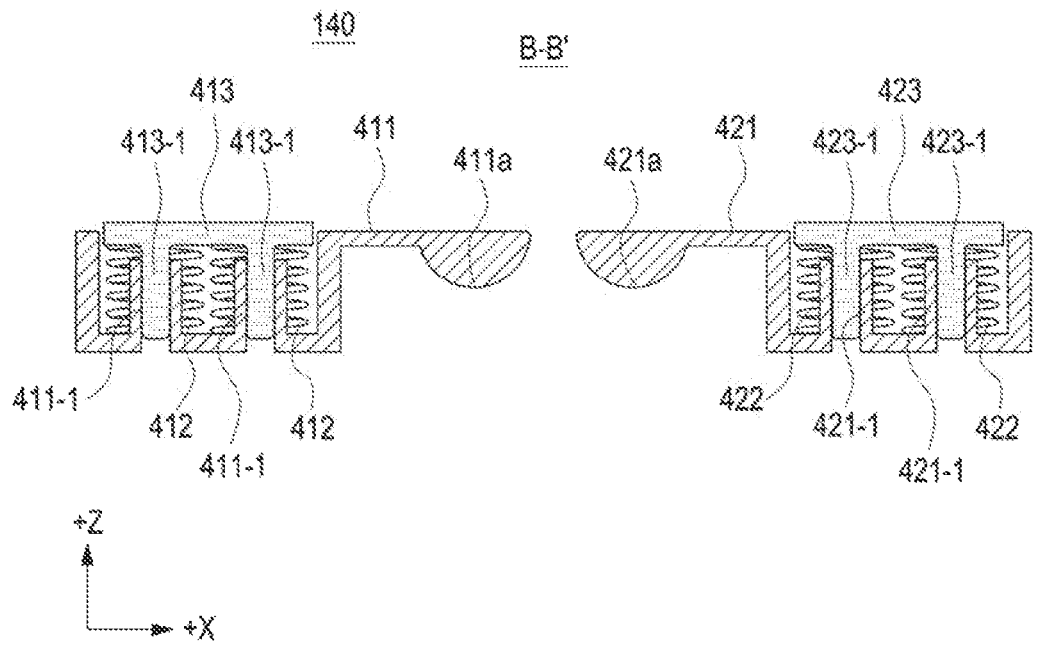
FIG. 17 is a cross-sectional view taken along line B-B' of FIG. 16 according to various embodiments of the disclosure.
Figure 18:
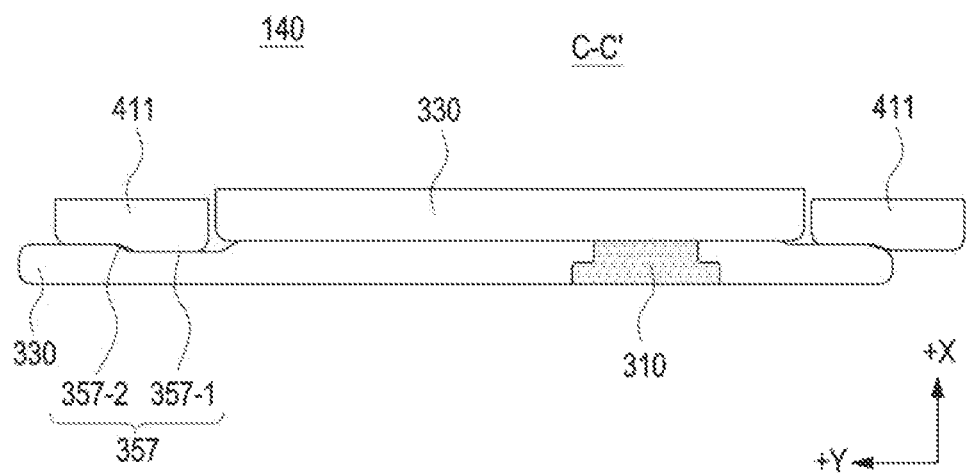
FIG. 18 is a cross-sectional view taken along line C-C' of FIG. 16 according to various embodiments of the disclosure.
Figure 19A:
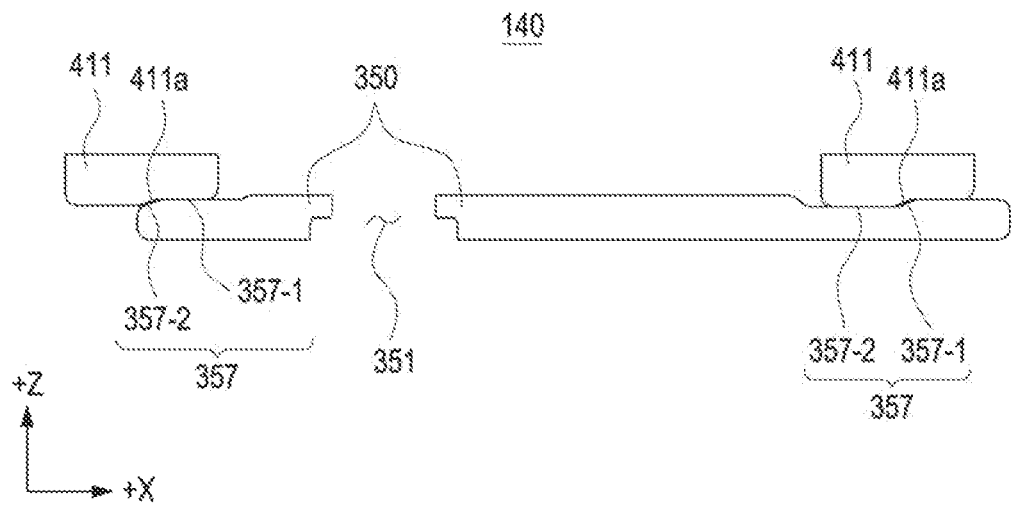
FIGS. 19A and 19B are views illustrating an operation in which a hinge module is fixed according to various embodiments of the disclosure.
Figure 19B:
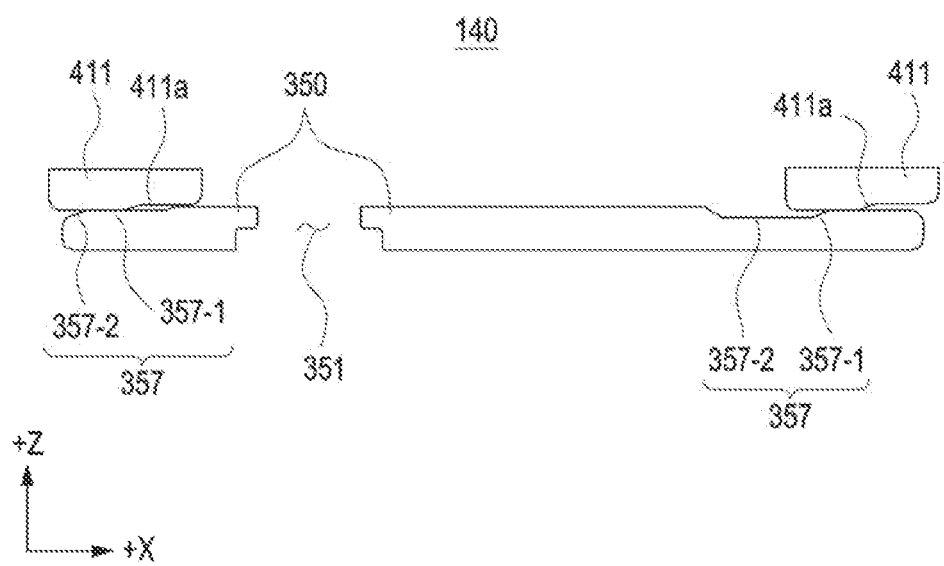

FIG. 16 is a front view illustrating a hinge module including a fixing structure according to various embodiments of the disclosure. FIG. 17 is a cross-sectional view taken along line B-B' of FIG. 16 according to various embodiments of the disclosure. FIG. 18 is a cross-sectional view taken along line C-C' of FIG. 16 according to various embodiments of the disclosure. FIGS. 19A and 19B are views illustrating an operation in which a hinge module is fixed according to various embodiments of the disclosure.

Referring to FIGS. 16, 17, 18, 19A, and 19B, the hinge module 140 may be adjusted for angle or position by the frictional force between a cam structure (e.g., the first cam structure 411) and the slide member 350. The configuration of the rotating structure 200, interlocking structure 300, and fixing structure 400 of FIGS. 16 to 18 may be identical in whole or part to the configuration of the rotating structure 200, the interlocking structure 300, and the fixing structure 400 of FIGS. 14A and 14B.

According to various embodiments, the slide member 350 may include at least one third cam structure 357 configured to contact the at least one first cam structure 411. According to an embodiment, the third cam structure 357 may contact the first cam structure 411 based on the slide of the slide member 350.

According to various embodiments, the first cam structure 411 may provide frictional force to the slide member 350. For example, the first cam structure 411 may come into contact with the third cam structure 357 of the slide member 350 based on the slide of the slide member 350.

According to various embodiments, the first cam structure 411 may accommodate at least one first resilient member 412 and/or the first detent bracket 413. For example, the first cam structure 411 may include at least one first pin structure 411-1 protruding toward the first detent bracket 413. According to an embodiment, the first pin structure 411-1 may be connected to the first detent bracket 413. According to an embodiment, the first detent bracket 413 may be accommodated in the first cam structure 411. For example, the first detent bracket 413 may include at least one second pin structure 413-1 protruding toward the first cam structure 411. According to an embodiment, the first resilient member 412 may be disposed to surround the first fin structure 411-1 and/or the second fin structure 413-1.

According to various embodiments, the first cam structure 411 may include a first curved surface 411a to face the slide member 350. The first curved surface 411a of the first cam structure 411 may face the third cam structure 357 of the slide member 350 to provide force or pressure to the slide member 350.

According to various embodiments, the description of the configuration of the first curved surface 411a of the first cam structure 411, the first pin structure 411-1 of the first cam structure 411, the first resilient member 412, and the second pin structure 413-1 of the first detent bracket 413 may be applied to the configuration of the second curved surface 421a of the second cam structure 421, the third cam structure 421-1 of the first cam structure 411, the second resilient member 422, and the fourth pin structure 423-1 of the second detent bracket 423.

According to various embodiments, the third cam structure 357 may be interpreted as a structure including a valley portion and a mounting portion. For example, the third cam structure 357 of the slide member 350 may include a first valley portion 357-1 and a first mounting portion 357-2. The first valley portion 357-1 and/or the second mounting portion 357-2 may be formed to correspond to the first cam structure 411 in the fully unfolded state (e.g., FIG. 19A) of the electronic device (e.g., the electronic device 100 of FIG. 1) and/or the fully folded state (e.g., FIG. 2) of the electronic device 100. For example, in the unfolded state (e.g., FIG. 1) of the electronic device (e.g., the electronic device 100 of FIG. 1) and/or the folded state (e.g., FIG. 2) of the electronic device 100, the first curved surface 411a of the first cam structure 411 may be formed in a shape corresponding to either the first valley portion 357-1 or the first mounting portion 357-2. According to an embodiment, in an intermediate state (e.g., FIG. 19B), at least a portion of the first curved surface 411a of the first cam structure 411 may be spaced apart from the first valley portion 357-1 and/or the first mounting portion 357-2. For example, the magnitude of the frictional force between the slide member 350 and the first cam structure 411 in the unfolded state may be larger than the magnitude of the frictional force between the slide member 350 and the first cam structure 411 in the intermediate state. According to an embodiment, the first detent member 410 including the first cam structure 411 may function as a free stop structure.

According to various embodiments, the slide member 350 may include at least one fourth cam structure. The description of the configuration of the third cam structure 357 may be applied to the configuration of the fourth cam structure. For example, the fourth cam structure may contact the second cam structure 421 of the second detent member 420 to generate frictional force.

According to various embodiments, the hinge module 140 may interlock the motions of the first housing (e.g., the first housing 110 of FIG. 1) and the second housing (e.g., the second housing 120 of FIG. 2) using the spiral rotating members 310 and 320 and the slide member 350. The spiral rotating members 310 and 320 may rotate about the slide member 350 in a surface contact state. Since the spiral rotating members 310 and 320 come into surface contact with the slide member 350, the length of the spiral rotating members 310 and 320 for generating the required frictional force may be reduced. For example, the third length 13 of the interlocking structure (e.g., the interlocking structure 300 of FIG. 8) may be shorter than the length of the interlocking structure that is not in surface contact. According to an embodiment, the fourth length 14 of the hinge module 140 may be about 37.5 mm.

Figure 20:
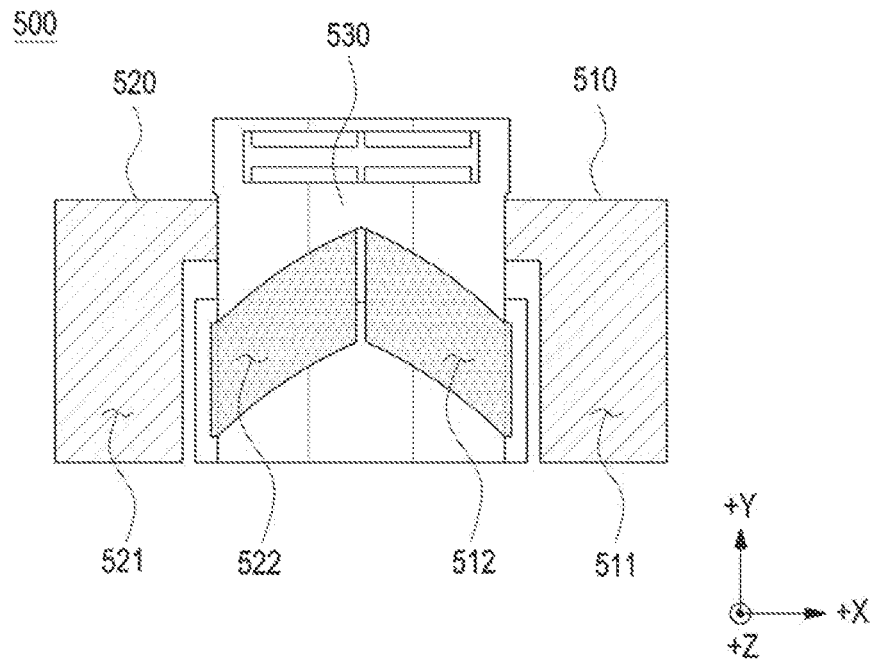
FIG. 20 is a top view illustrating a hinge module according to one of various embodiments of the disclosure.
Figure 21:
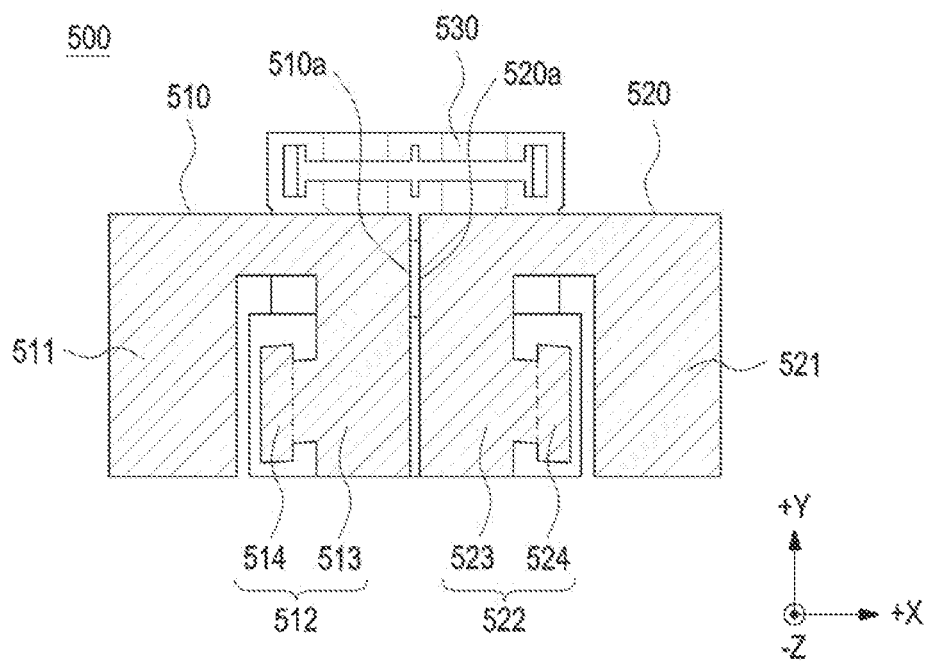
FIG. 21 is a rear view illustrating the hinge module of FIG. 20.

FIG. 20 is a top view illustrating a hinge module according to one of various embodiments of the disclosure; FIG. 21 is a rear view illustrating the hinge module of FIG. 20.

Referring to FIGS. 20 and 21, the hinge module 500 may include a first spiral rotating member 510, a second spiral rotating member 520, and a slide member 530. The hinge module 500 of FIGS. 20 and 21 may be identical in whole or part to the configuration of the hinge module 140 of FIG. 5A. For example, the first spiral rotating member 510, the second spiral rotating member 520, and the slide member 530 of FIGS. 20 and 21 may be identical in whole or part to the configuration of the first spiral rotating member, the second spiral rotating member 320, and the slide member 350 of the interlocking structure 300 of FIG. 8.

According to various embodiments, the slide member 530 may accommodate the first spiral rotating member 510 and the second spiral rotating member 520. According to an embodiment, the slide member 530 may be slid in the length direction (e.g., Y-axis direction) of the hinge module 500 based on rotation of the first spiral rotating member 510 or the second spiral rotating member 520. According to an embodiment, the first spiral rotating member 510 may be formed in a substantially symmetrical shape with respect to the second spiral rotating member 520. For example, the first spiral rotating member 510 and the second spiral rotating member 520 may be formed symmetrically with respect to the length direction (e.g., the Y-axis direction) of the hinge module 500. According to an embodiment, at least a portion (e.g., the first surface 510*a* of the first spiral rotating member 510) of the first spiral rotating member 510 may face at least a portion (e.g., the second surface 520*a* of the second spiral rotating member 520) of the second spiral rotating member 520. According to an embodiment, the slide member 350 may include a first through hole (e.g., the first through hole 351 of FIG. 6B) and a second through hole (e.g., the second through hole 352 of FIG. 6B) symmetrically formed with each other. The first spiral rotating member 510 and the second spiral rotating member 520 may be accommodated in the first through hole 351 and the second through hole 352, respectively. According to an embodiment, the length of the hinge module 500 in which the first spiral rotating member 510 and the second spiral rotating member 520 are formed symmetrically may be shorter than the length of a hinge module (e.g., the hinge module 140 of FIG. 5A) in which they are asymmetrically formed.

According to various embodiments, the first spiral rotating member 510 may include a first bracket 511 connected to the first housing (e.g., the first housing 110 of FIG. 1) and a first spiral rotating bracket 512 extending from the first bracket 511 and configured to rotate in the slide member 530. According to an embodiment, the first spiral rotating bracket 512 may include a first spiral rotating rail 513 positioned in a through hole (e.g., the first through hole 351 of FIG. 6B) of the slide member 350 and at least one first protruding area 514 extending from the first spiral rotating rail 513. The configuration of the first bracket 511, the first spiral rotating bracket 512, the first spiral rotating rail 513, and the first protruding area 514 of FIGS. 20 and/or 21 may be identical in whole or part to the configuration of the first bracket 311, the first spiral rotating bracket 312, the first spiral rotating rail 313, and the first protruding area 314 of FIG. 8 and/or FIG. 12.

According to various embodiments, the second spiral rotating member 520 may include a second bracket 521 connected to the second housing (e.g., the second housing 120 of FIG. 1) and a second spiral rotating bracket 522 extending from the second bracket 521 and configured to rotate in the slide member 530. According to an embodiment, the second spiral rotating bracket 522 may include a second spiral rotating rail 523 positioned in a through hole (e.g., the second through hole 352 of FIG. 6B) of the slide member 530 and at least one second protruding area 524 extending from the second spiral rotating rail 523. The configuration of the second bracket 521, the second spiral rotating bracket 522, the second spiral rotating rail 523, and the second protruding area 524 of FIGS. 20 and/or 21 may be identical in whole or part to the configuration of the first bracket 511, the first spiral rotating bracket 512, the first spiral rotating rail 513, and the first protruding area 514.

According to various embodiments, the hinge module 500 may include a guide member (e.g., 330 or 340 of FIG. 14A). For example, the guide members 330 and 340 may surround at least a portion of the first spiral rotating member 510 or at least a portion of the second spiral rotating member 520 and, along with the first spiral rotating member 510 and the second spiral rotating member 520, rotate about the slide member 530.

According to various embodiments, the hinge module 500 may include a fixing structure (e.g., the fixing structure 400 of FIG. 14A). For example, at least a portion of the first spiral rotating member 510, at least a portion of the second spiral rotating member 520, and/or at least a portion of the slide member 530 may be surrounded by the first detent member (e.g., the first detent member 410 of FIG. 14A) and/or the second detent member (e.g., the second detent member 420 of FIG. 14A). According to an embodiment, the slide member 530 may accommodate pressure transferred by the detent members 410 and 420, preventing or reducing a slide.

Figure 22:
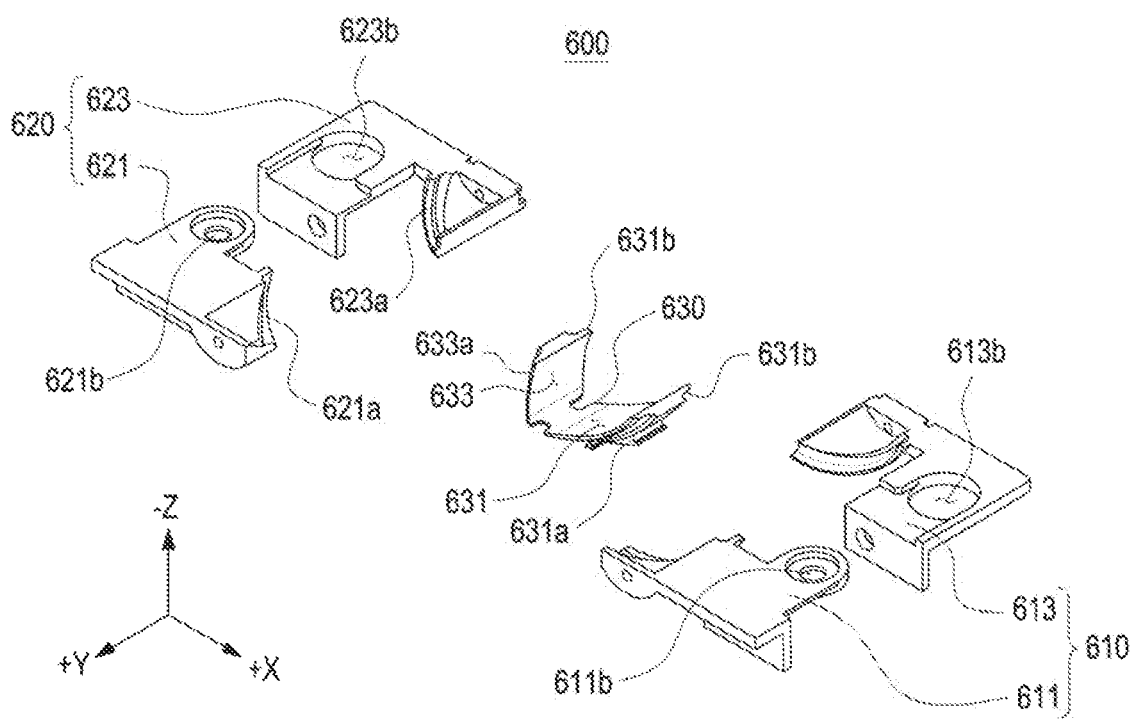
FIG. 22 is an exploded perspective view illustrating a hinge module according to one of various embodiments of the disclosure.
Figure 23:
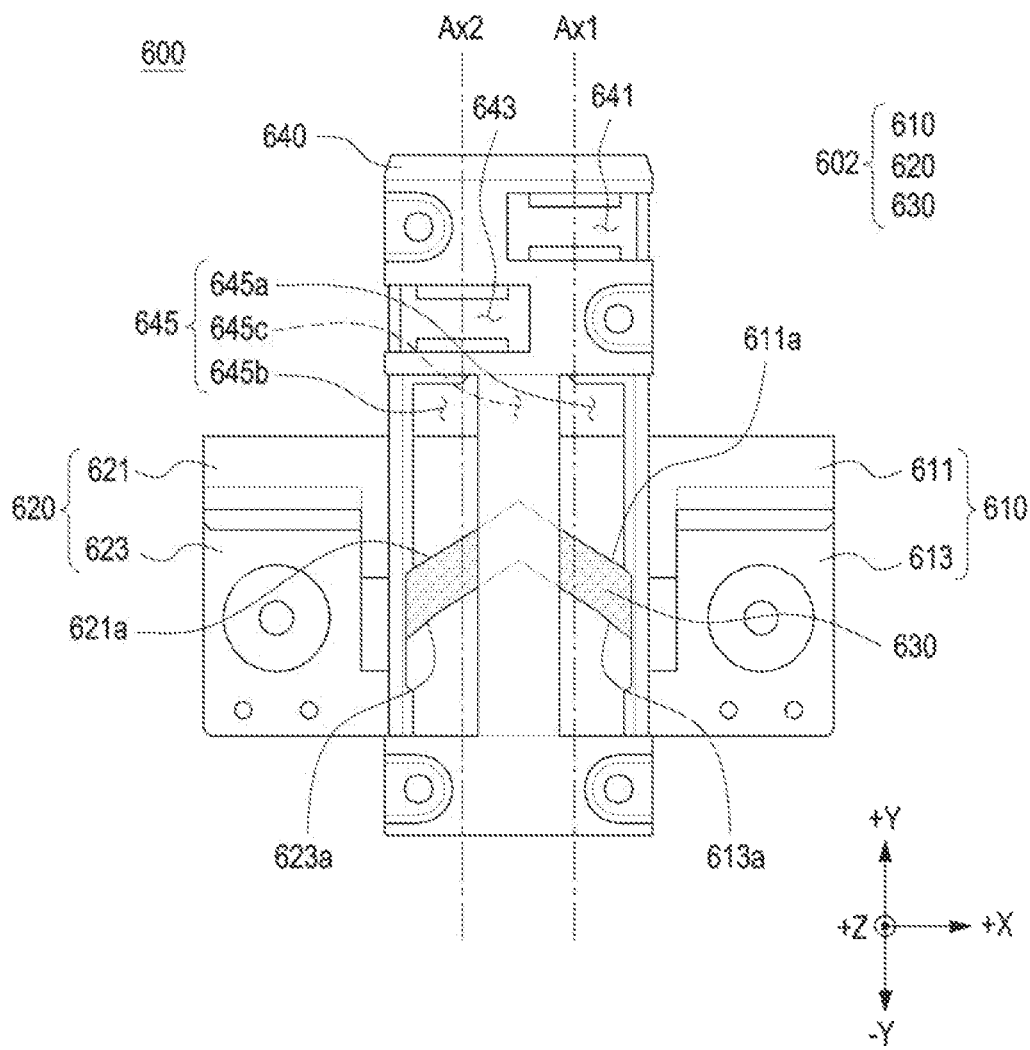
FIG. 23 is a top view illustrating a hinge module according to one of various embodiments of the disclosure.
Figure 24:
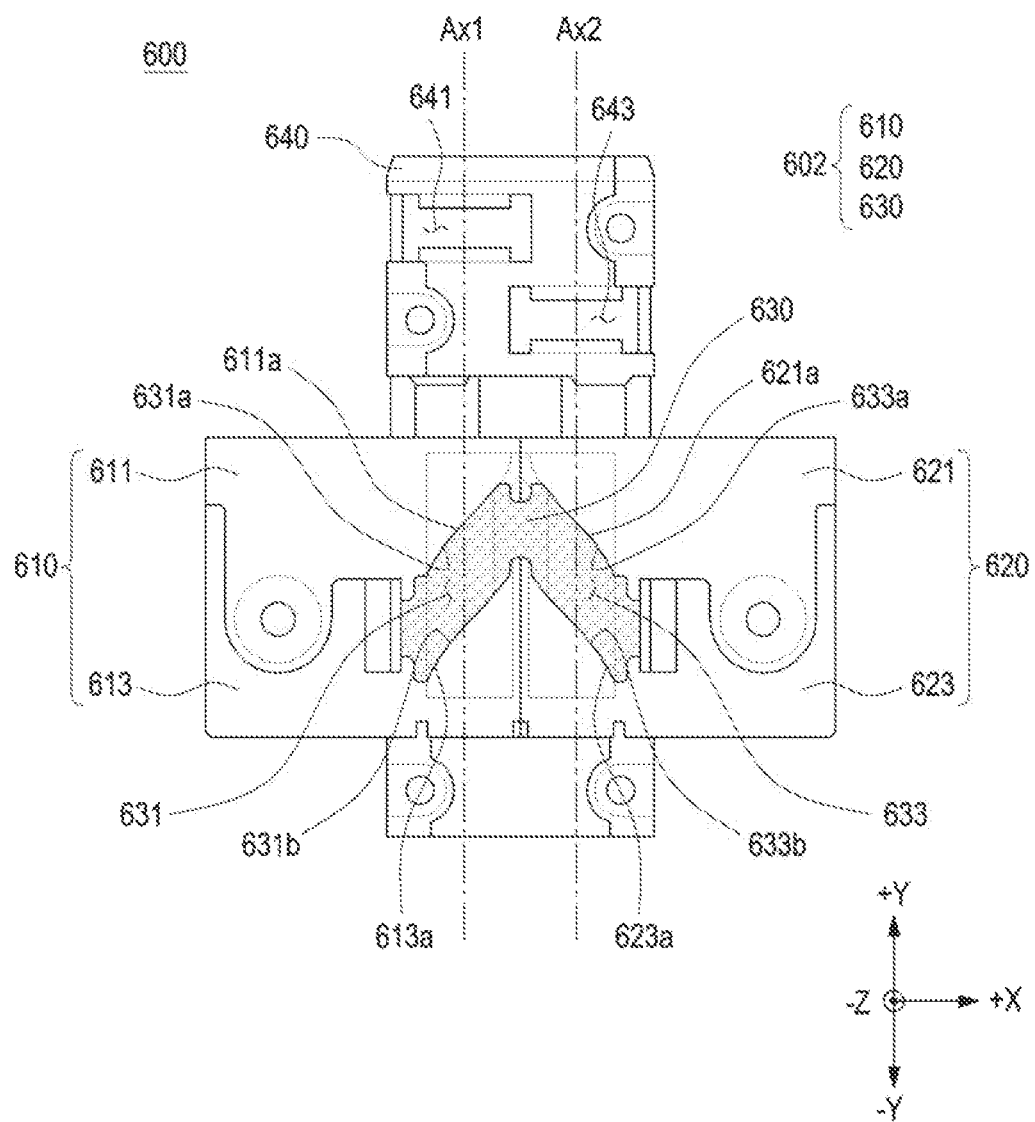
FIG. 24 is a rear view illustrating the hinge module of FIG. 23 in an unfolded state.
Figure 25:
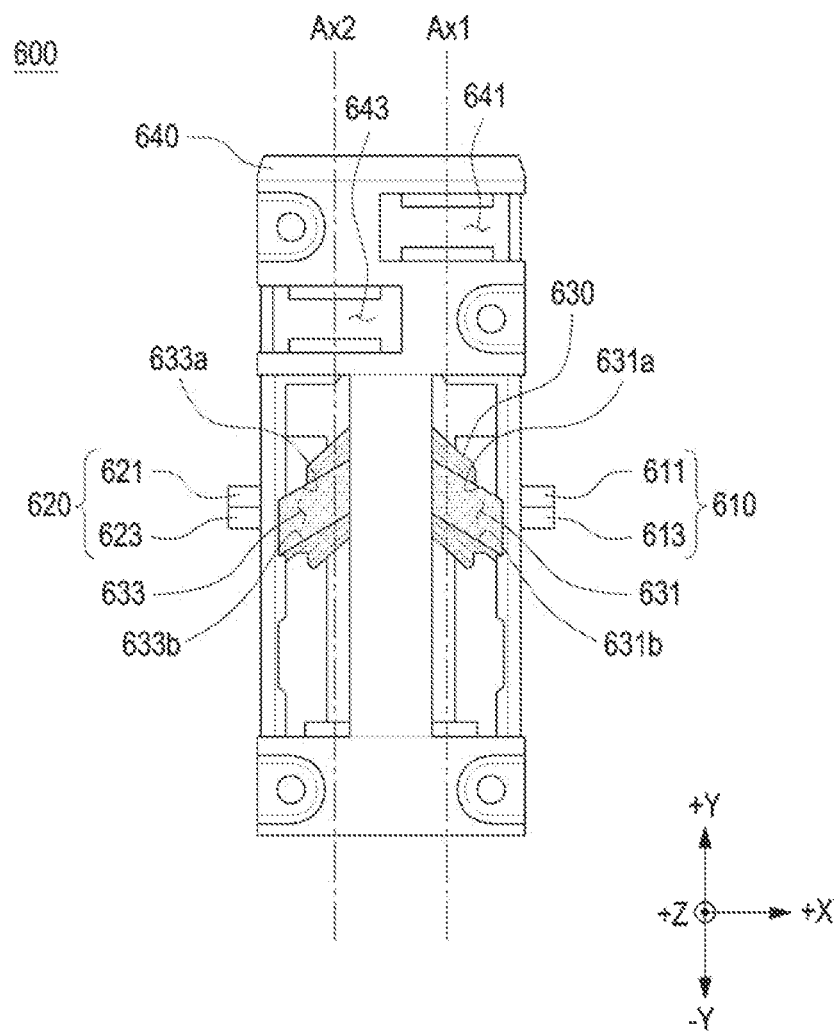
FIG. 25 is a rear view illustrating the hinge module of FIG. 23 in a folded state.

FIG. 22 is an exploded perspective view illustrating a hinge module according to one of various embodiments of the disclosure. FIG. 23 is a top view illustrating a hinge module according to one of various embodiments of the disclosure; FIG. 24 is a rear view illustrating the hinge module of FIG. 23 in an unfolded state. FIG. 25 is a rear view illustrating the hinge module of FIG. 23 in a folded state.

Referring to FIGS. 22 to 25, a hinge module 600 may include a first spiral rotating member 610, a second spiral rotating member 620, a slide member 630, and/or a hinge bracket 640. The configuration of the hinge module 600, the first spiral rotating member 610, and the second spiral rotating member 620 of FIGS. 22, 23, 24, and/or 25 may be identical in whole or part to the configuration of the hinge module 140, the first spiral rotating member 310 and the second spiral rotating member 320 of FIG. 5A.

According to various embodiments, the first spiral rotating member 610 and/or the second spiral rotating member 620 may accommodate at least a portion of the slide member 630. For example, the first spiral rotating member 610 may surround at least a portion (e.g., the first slide area 631) of the slide member 630. The second spiral rotating member 620 may surround at least a portion (e.g., the second slide area 633) of the slide member 630. According to an embodiment, the first spiral rotating member 610 and/or may guide the slide member 630. For example, the first spiral rotating member 610 may include a fifth surface 611*a* facing the first slide area 631 and a sixth surface 613*a* facing the first slide area 631 and substantially parallel to the fifth surface 611*a*. The second spiral rotating member 620 may include a seventh surface 621*a* facing the second slide area 633 and an eighth surface 623*a* facing the second slide area 633 and substantially parallel to the seventh surface 621*a*.

According to various embodiments, an empty space between the fifth surface 611*a* and the sixth surface 613*a* may have substantially the same configuration as the through hole (e.g., the first through hole 351 of FIG. 6B). For example, the configuration of the first spiral rotating member 610 may be identical in whole or part to the configuration of the first area 355 of the slide member 350 of FIG. 8, and the fifth surface 611*a* and/or the sixth surface 613*a* may be a spiral surface formed around the first rotational axis Ax1. According to an embodiment, the first spiral rotating member 610 may rotate in a state of being in surface contact with the slide member 630 by the fifth surface 611*a* and the sixth surface 613*a*. According to an embodiment, the first spiral rotating member 610 may be connected to the first housing (e.g., the first housing 110 of FIG. 1). For example, the first spiral rotating member 610 may rotate about the first rotational axis Ax1 while being connected to the first housing 110.

According to various embodiments, an empty space between the seventh surface 621*a* and the eighth surface 623*a* may have substantially the same configuration as the through hole (e.g., the second through hole 352 of FIG. 6B). For example, the configuration of the second spiral rotating member 620 may be identical in whole or part to the configuration of the second area 356 of the slide member 350 of FIG. 8, and the seventh surface 621*a* and/or the eighth surface 623*a* may be a spiral surface formed around the second rotational axis Ax2. According to an embodiment, the second spiral rotating member 620 may rotate in a state of being in surface contact with the slide member 630 by the seventh surface 621a and the eighth surface 623a. According to an embodiment, the second spiral rotating member 620 may be connected to the second housing (e.g., the second housing 120 of FIG. 1). For example, the second spiral rotating member 620 may rotate about the second rotational axis Ax1 while being connected to the second housing 120.

According to various embodiments, the first spiral rotating member 610 may be composed of a plurality of components. For example, the first spiral rotating member 610 may include a 1-1th spiral rotating member 611 and a 1-2th spiral rotating member 613 to be fastened with the 1-1th spiral rotating member 611. According to an embodiment, the 1-1th spiral rotating member 611 may include the fifth surface 611a. The 1-2th spiral rotating member 613 may include the sixth surface 613a. According to an embodiment, at least a portion of the 1-1th spiral rotating member 611 may face a portion (e.g., the 3-1th spiral rotating rail 631a) of the first slide area 631. At least a portion of the 1-2th spiral rotating member 613 may face another portion (e.g., the 3-2th spiral rotating rail 631b) of the first slide area 631. According to an embodiment, the 1-1th spiral rotating member 611 may include a first fastening area 611b. The 1-2th spiral rotating member 613 may include a second fastening area 613b that may be connected to the first fastening area 611b. For example, the second fastening area 613b may be formed as a through hole or recess structure. The first fastening area 611b may be inserted into the second fastening area 613b. The first fastening area 611b may include a through hole or recess structure to reduce the weight and/or volume of the hinge module 600. As another example, the first fastening area 611b may be formed as a through hole or recess structure. The second fastening area 613b may be inserted into the first fastening area 611b. The second fastening area 613b may include a through hole or recess structure to reduce the weight and/or volume of the hinge module 600.

According to various embodiments, the second spiral rotating member 620 may be composed of a plurality of components. For example, the second spiral rotating member 620 may include a 2-1th spiral rotating member 621 and a 2-2th spiral rotating member 623 to be fastened with the 2-1th spiral rotating member 621. According to an embodiment, the 2-1th spiral rotating member 621 may include the seventh surface 621a. The 2-2th spiral rotating member 623 may include the eighth surface 623a. According to an embodiment, at least a portion of the 2-1th spiral rotating member 621 may face a portion (e.g., the 4-1th spiral rotating rail 633a) of the second slide area 633. At least a portion of the 2-2th spiral rotating member 623 may face another portion (e.g., the 4-2th spiral rotating rail 633b) of the second slide area 633. According to an embodiment, the 2-1th spiral rotating member 621 may include a third fastening area 621b. The 2-2th spiral rotating member 623 may include a fourth fastening area 623b that may be connected to the third fastening area 621b. For example, the fourth fastening area 623b may be formed as a through hole or recess structure. The third fastening area 621b may be inserted into the fourth fastening area 623b. The third fastening area 621b may include a through hole or recess structure to reduce the weight and/or volume of the hinge module 600. As another example, the third fastening area 621b may be formed as a through hole or recess structure. The fourth fastening area 623b may be inserted into the third fastening area 621b. The fourth fastening area 623b may include a through hole or recess structure to reduce the weight and/or volume of the hinge module 600.

According to an embodiment, the assembly and/or processing convenience of the hinge module 600 in which the first spiral rotating member 610 and/or the second spiral rotating member 620 includes a plurality of components (e.g., the 1-1th spiral rotating member 611, the 1-2th spiral rotating member 613, the 2-1th spiral rotating member 621, and/or the 2-2th spiral rotating member 623) may be further increased than the assembly and/or processing convenience of the hinge module using one first spiral rotating member 610 and/or one second spiral rotating member 620.

According to various embodiments, the slide member 630 may include a first slide area 631 connected to the first spiral rotating member 610 and a second slide area 633 connected to the second spiral rotating member 620. According to an embodiment, the first slide area 631 may be disposed between the 1-1th spiral rotating member 611 and the 1-2th spiral rotating member 613. According to an embodiment, the first slide area 631 may include a 3-1th spiral rotating rail 631a facing the 1-1th spiral rotating member 611 and a 3-2th spiral rotating rail 631b facing the 1-2th spiral rotating member 621. According to an embodiment, the second slide area 633 may be disposed between the 2-1th spiral rotating member 621 and the 2-2th spiral rotating member 623. According to an embodiment, the second slide area 633 may include a 4-1th spiral rotating rail 633a facing the 2-1st spiral rotating member 621 and a 4-2th spiral rotating rail 633b facing the 2-2th spiral rotating member 623.

According to various embodiments, the slide member 630 may slide based on the movement of the first spiral rotating member 610 and/or the second spiral rotating member 620. For example, the slide member 630 may include third spiral rotating rails 631a and 631b and/or fourth spiral rotating rails 633a and 633b extending in a curved trajectory. According to an embodiment, force or pressure may be provided to the third spiral rotating rails 631a and 631b of the first slide area 631 as the first spiral rotating member 610 rotates. As the second spiral rotating member 620 rotates, force or pressure may be provided to the fourth spiral rotating rails 633a and 633b of the second slide area 633.

According to various embodiments, the third spiral rotating rails 631a and 631b may face the first spiral rotating member 610. For example, the third spiral rotating rails 631a and 631b may include a 3-1th spiral rotating rail 631a configured to slide based on the rotation of the fifth surface 611a of the 1-1th spiral rotating member 611 and a 3-2th spiral rotating rail 631b configured to slide based on the rotation of the sixth surface 613a of the 1-2th spiral rotating member 613. According to an embodiment, the 3-1th spiral rotating rail 631a may be formed to be substantially parallel to the 3-2th spiral rotating rail 631b.

According to various embodiments, the fourth spiral rotating rails 633a and 633b may face the second spiral rotating member 620. For example, the fourth spiral rotating rails 633a and 633b may include a 4-1th spiral rotating rail 633a configured to slide based on the rotation of the seventh surface 621a of the 2-1st spiral rotating member 621 and a 4-2th spiral rotating rail 633b configured to slide based on the rotation of the eighth surface 623a of the 2-2th spiral rotating member 623. According to an embodiment, the 4-1th spiral rotating rail 633a may be formed to be substantially parallel to the 4-2th spiral rotating rail 633b.

According to various embodiments, the hinge bracket 640 may accommodate a first rotating member (e.g., the first rotating member 210 of FIG. 6A) and/or a second rotating member (e.g., the second rotating member 620 of FIG. 6A). For example, the hinge bracket 640 may include a first rotating space 641 in which the first rotating member 210 is rotatably accommodated or positioned and a second rotating space 643 in which the second rotating member 220 is rotatably accommodated or positioned. The configuration of the hinge bracket 640 of FIGS. 23 to 25 may be identical in whole or part to the configuration of the rotating bracket 230 of FIG. 6A. For example, the configuration of the first rotating space 641 and the second rotating space 643 of FIGS. 23 to 25 may be identical in whole or part to the configuration of the first rotating space 231 and the second rotating space 232 of FIG. 7.

According to various embodiments, the hinge bracket 640 may accommodate at least a portion of the interlocking structure 602. For example, the interlocking structure 602 may include a first spiral rotating member 610, a second spiral rotating member 620, and a slide member 630. The hinge bracket 640 may include an accommodating space 645 in which the interlocking structure 602 is rotatably or slidably accommodated. According to an embodiment, the accommodating space 645 may include a third rotating space 645a for accommodating at least a portion of the first spiral rotating member 610, a fourth rotating space 645b for accommodating at least a portion of the second spiral rotating member 620, and an accommodating space 645c for accommodating at least a portion of the slide member 630. According to an embodiment, the accommodating space 645c may be positioned between the third rotating space 645a and the fourth rotating space 645b. According to an embodiment, the third rotating space 645a, the fourth rotating space 645b, and/or the accommodating space 645c may be formed in a shape of a recess or a through hole. According to an embodiment, the third rotating space 645a, the fourth rotating space 645b, and the accommodating space 645c may be one empty space. According to an embodiment, the first spiral rotating member 610 may rotate about the hinge bracket 640 with respect to the first rotational axis Ax1 in the third rotating space 645a. According to an embodiment, the second spiral rotating member 620 may rotate about the hinge bracket 640 with respect to the second rotational axis Ax2 in the fourth rotating space 645b. According to an embodiment, the slide member 630 may slide with respect to the hinge bracket 640 in a direction (e.g., Y-axis direction) substantially parallel to the first rotational axis Ax1 or the second rotational axis Ax2 in the accommodating space 645c.

According to various embodiments, the hinge module 600 may include a guide member (e.g., 330 or 340 of FIG. 14A). For example, the guide members 330 and 340 may surround at least a portion of the first spiral rotating member 610 or at least a portion of the second spiral rotating member 620 and, along with the first spiral rotating member 610 and the second spiral rotating member 620, rotate about the slide member 630.

According to various embodiments, the hinge module 600 may include a fixing structure (e.g., the fixing structure 400 of FIG. 14A). For example, at least a portion of the first spiral rotating member 610, at least a portion of the second spiral rotating member 620, and/or at least a portion of the slide member 630 may be surrounded by the first detent member (e.g., the first detent member 410 of FIG. 14A) and/or the second detent member (e.g., the second detent member 420 of FIG. 14A). According to an embodiment, the slide member 630 may accommodate pressure transferred by the detent members 410 and 420, preventing or reducing a slide.

According to various embodiments of the disclosure, an electronic device (e.g., the electronic device 100 of FIG. 1) may comprise a first housing (e.g., the first housing 110 of FIG. 1), a second housing (e.g., the second housing 120 of FIG. 2), a display (e.g., the display 130 of FIG. 1) accommodated in the first housing and the second housing, and a hinge module (e.g., the hinge module 140 of FIG. 3) connecting the first housing and the second housing. The hinge module may include a rotating structure (e.g., the rotating structure 200 of FIG. 5A) including a first rotating member (e.g., the first rotating member 210 of FIG. 5A) connected with the first housing, a second rotating member (e.g., the second rotating member 220 of FIG. 5A) connected with the second housing, and a rotating bracket (e.g., the rotating bracket 230 of FIG. 5A) accommodating the first rotating member and the second rotating member and an interlocking structure (e.g., the interlocking structure 300 of FIG. 5A) including a first spiral rotating member (e.g., the first spiral rotating member 310 of FIG. 5A) connected with the first housing, a second spiral rotating member (e.g., the second spiral rotating member 320 of FIG. 5A) connected with the second housing, a first guide member (e.g., the first guide member 330 of FIG. 5A) connected with the first housing and surrounding at least a portion of the first spiral rotating member, a second guide member (e.g., the second guide member 340 of FIG. 5A) connected with the second housing and surrounding at least a portion of the second spiral rotating member and a slide member (e.g., the slide member 350 of FIG. 6A) including a first through hole (e.g., the first through hole 351 of FIG. 6B) for accommodating at least a portion of the first spiral rotating member and a second through hole (e.g., the second through hole 352 of FIG. 6B) for accommodating at least a portion of the second spiral rotating member and configured to slide based on a motion of the first spiral rotating member or the second spiral rotating member.

According to various embodiments, the slide member may include a first surface (e.g., the first surface 350a of FIG. 8) forming at least a portion of the first through hole, a second surface (e.g., the second surface 350b of FIG. 8) forming at least a portion of the first through hole and substantially parallel to the first surface, a third surface (e.g., the third surface 350c of FIG. 8) forming at least a portion of the second through hole, and a fourth surface (e.g., the fourth surface 350d of FIG. 8) forming at least a portion of the second through hole and substantially parallel to the third surface.

According to various embodiments, the rotating bracket may include a first rotating space (e.g., the first rotating space 231 of FIG. 7) for accommodating the first rotating member and providing a first rotational axis (e.g., the first rotational axis Ax1 of FIG. 4) and a second rotating space (e.g., the second rotating space 232 of FIG. 7) for accommodating the second rotating member and providing a second rotational axis (e.g., the first rotational axis Ax1 of FIG. 4) substantially parallel to the first rotational axis.

According to various embodiments, the slide member may include a first area (e.g., the first area 355 of FIG. 8) including a first outer surface (e.g., the first outer surface s1 of FIG. 8) spaced apart from the first rotational axis by a first distance (e.g., the first distance d1 of FIG. 8) and a first inner surface (e.g., the first surface s2 of FIG. 8) spaced apart from the second rotational axis by a second distance (e.g., the second distance d2 of FIG. 8) shorter than the first distance and a second area (e.g., the second area 356 of FIG. 8) including a second outer surface (e.g., the second outer surface s3 of FIG. 8) spaced apart from the second rotational axis by the first distance and a second inner surface (e.g., the second inner surface s4 of FIG. 8) spaced apart from the second rotational axis by the second distance.

According to various embodiments, the hinge module may include a fixing structure (e.g., the fixing structure 400 of FIG. 14A) including a first detent member (e.g., the first detent member 410 of FIG. 14A) connected to the first housing and facing at least a portion of the slide member and at least a portion of the first guide member and a second detent member (e.g., the second detent member 420 of FIG. 14A) connected to the second housing and facing at least a portion of the slide member and at least a portion of the second guide member.

According to various embodiments, the first detent member may include at least one first cam structure (e.g., the first cam structure 411 of FIG. 14A) configured to provide a frictional force to the slide member, at least one first resilient member (e.g., the first resilient member 412 of FIG. 14A) for providing an elastic force to the at least one first cam structure, and a first detent bracket (e.g., the first detent bracket 413 of FIG. 14A) connected with the at least one first cam structure, and the second detent member may include at least one second cam structure (e.g., the second cam structure 421 of FIG. 14A) configured to provide a frictional force to the slide member, at least one second resilient member (e.g., the second resilient member 422 of FIG. 14A) for providing an elastic force to the at least one second cam structure, and a second detent bracket (e.g., the second detent bracket 423 of FIG. 14A) connected with the at least one second cam structure.

According to various embodiments, the slide member may include at least one third cam structure (e.g., the third cam structure 357 of FIG. 18) configured to contact the at least one first cam structure and at least one fourth cam structure configured to contact the at least one second cam structure.

According to various embodiments, the first spiral rotating member may include a first bracket (e.g., the first bracket 311 of FIG. 8) connected with the first housing and a first spiral rotating bracket (e.g., the first spiral rotating bracket 312 of FIG. 8) extending from the first bracket and configured to rotate in the first through hole, and the second spiral rotating member may include a second bracket (e.g., the second bracket 321 of FIG. 8) connected with the second housing and a second spiral rotating bracket (e.g., the second spiral rotating bracket 322 of FIG. 8) extending from the second bracket and configured to rotate in the second through hole.

According to various embodiments, the first spiral rotating bracket may include a first spiral rotating rail (e.g., the first spiral rotating rail 313 of FIG. 12) facing the first guide member and a first protruding area (e.g., the first protruding area 314 of FIG. 12) extending from the first spiral rotating rail, and the second spiral rotating bracket may include a second spiral rotating rail facing the second guide member and a second protruding area extending from the second spiral rotating rail.

According to various embodiments, the first spiral rotating bracket may be disposed between the first guide member and the slide member, and the second spiral rotating bracket may be disposed between the second guide member and the slide member.

According to various embodiments, the electronic device may further comprise a hinge cover (e.g., the hinge cover 150 of FIG. 4) connected with the rotating structure and configured to guide a movement of the slide member.

According to various embodiments, the hinge cover may include an accommodating recess (e.g., the accommodating recess 151 of FIG. 3) for accommodating the slide member.

According to various embodiments, the slide member may include a first recess (e.g., the first recess 355-1 of FIG. 5A) for guiding rotation of the first guide member and a second recess (e.g., the second recess 356-1 of FIG. 5B) for guiding rotation of the second guide member.

According to various embodiments, the first guide member may include at least one first protrusion (e.g., the first protrusion 331 of FIG. 11) facing the first rotating member and accommodated in the first recess, and the second guide member may include at least one second protrusion (e.g., the second protrusion 341 of FIG. 11) facing the second rotating member and accommodated in the second recess.

According to various embodiments, a distance between the slide member and the rotating structure may be configured to be varied based on an angle between the first housing and the second housing.

According to various embodiments, at least a portion of the first spiral rotating member may be configured to rotate with respect to the slide member along with the first guide member, and at least a portion of the second spiral rotating member may be configured to rotate with respect to the slide member along with the second guide member.

According to various embodiments of the disclosure, an electronic device may comprise a first housing (e.g., the first housing 110 of FIG. 1), a second housing (e.g., the second housing 120 of FIG. 2), a display (e.g., the display 130 of FIG. 1) accommodated in the first housing and the second housing, a hinge module (e.g., the hinge module 140 of FIG. 3) connecting the first housing and the second housing, and a hinge cover disposed between the housing and the hinge module. The hinge module may include a rotating structure (e.g., the rotating structure 200 of FIG. 5A) accommodating a first rotating member (e.g., the first rotating member 210 of FIG. 5A) connected with the first housing, a second rotating member (e.g., the second rotating member 220 of FIG. 5A) connected with the second housing, and a rotating bracket (e.g., the rotating bracket 230 of FIG. 5A) accommodating the first rotating member and the second rotating member and an interlocking structure (e.g., the interlocking structure 300 of FIG. 5A) including a first spiral rotating member (e.g., the first spiral rotating member 310 of FIG. 5A) connected with the first housing, a second spiral rotating member (e.g., the second spiral rotating member 320 of FIG. 5A) connected with the second housing, and a slide member (e.g., the slide member 350 of FIG. 6A) including a first through hole (e.g., the first through hole 351 of FIG. 6A) for accommodating the first spiral rotating member, and a second through hole (e.g., the second through hole 352 of FIG. 6A) for accommodating the second spiral rotating member and configured to slide based on a movement of the first spiral rotating member or the second spiral rotating member. The hinge cover may be configured to guide a slide of the slide member.

According to various embodiments, the slide member may include a first surface (e.g., the first surface 350a of FIG. 8) forming at least a portion of the first through hole, a second surface (e.g., the second surface 350b of FIG. 8) forming at least a portion of the first through hole and substantially parallel to the first surface, a third surface (e.g., the third surface 350c of FIG. 8) forming at least a portion of the second through hole, and a fourth surface (e.g., the fourth surface 350d of FIG. 8) forming at least a portion of the second through hole and substantially parallel to the third surface.

According to various embodiments, the rotating bracket may include a first rotating space (e.g., the first rotating space 231 of FIG. 7) for accommodating the first rotating member and providing a first rotational axis (e.g., the first rotational axis Ax1 of FIG. 7) and a second rotating space (e.g., the second rotating space 232 of FIG. 7) for accommodating the second rotating member and providing a second rotational axis (e.g., the second rotational axis Ax2 of FIG. 7) substantially parallel to the first rotational axis. The slide member may include a first area (e.g., the first area 355) including a first outer surface (e.g., the first surface s1 of FIG. 8) spaced apart from the first rotational axis by a first distance (e.g., the first distance d1 of FIG. 8) and a first inner surface (e.g., the first inner surface s2 of FIG. 8) spaced apart from the first rotational axis by a second distance (e.g., the second distance d2 of FIG. 8) shorter than the first distance and a second area (e.g., the second area 356) including a second outer surface (e.g., the second outer surface s3 of FIG. 8) spaced apart from the second rotational axis by the first distance and a second inner surface (e.g., the second inner surface s4 of FIG. 8) spaced apart from the second rotational axis by the second distance.

According to various embodiments, the slide member may include a first area (e.g., the first area 355 of FIG. 11) including the first through hole and a second area (e.g., the second area 356 of FIG. 11) extending from the first area and including the second through hole. The hinge cover may include an accommodating recess (e.g., the accommodating recess 151 of FIG. 3) for accommodating the first area and the second area.

According to various embodiments, the hinge module may include a fixing structure (e.g., the fixing structure 400 of FIG. 14A) including a first detent member (e.g., the first detent member 410 of FIG. 13) connected to the first housing and facing at least a portion of the slide member and a second detent member (e.g., the second detent member 420 of FIG. 13) connected to the second housing and facing at least a portion of the slide member.

According to various embodiments of the disclosure, an electronic device (e.g., the electronic device 100 of FIG. 2) may comprise a first housing (e.g., the first housing 110 of FIG. 1), a second housing (e.g., the second housing 120 of FIG. 1), a display (e.g., the display 130 of FIG. 1) accommodated in the first housing and the second housing, and a hinge module (e.g., the hinge module 600 of FIG. 23) connecting the first housing and the second housing. The hinge module may include a rotating structure (e.g., the rotating structure 200 of FIG. 7) including a first rotating member (e.g., the first rotating member 210 of FIG. 7) connected with the first housing and a second rotating member (e.g., the second rotating member 220 of FIG. 7) connected with the second housing, an interlocking structure (e.g., the interlocking structure 602 of FIG. 23) including a first spiral rotating member (e.g., the first spiral rotating member 610 of FIG. 22) connected with the first housing, a second spiral rotating member (e.g., the second spiral rotating member 620 of FIG. 22) connected with the second housing, and a slide member (e.g., the slide member 630 of FIG. 22) including a first slide area (e.g., the first slide area 631 of FIG. 22) connected to the first spiral rotating member and a second slide area (e.g., the second slide area 633 of FIG. 22) connected to the second spiral rotating member and configured to slide based on rotation of the first spiral rotating member or the second spiral rotating member, and a hinge bracket (e.g., the hinge bracket 640 of FIG. 23) including a first rotating space (e.g., the first rotating space 641 of FIG. 23) for accommodating the first rotating member and providing a first rotational axis (e.g., the first rotational axis Ax1 of FIG. 23), a second rotating space (e.g., the second rotating space 643 of FIG. 23) for accommodating the second rotating member and providing a second rotational axis (e.g., the second rotational axis Ax2 of FIG. 23), and an accommodating space (e.g., the accommodating space 645 of FIG. 23) for accommodating the interlocking structure.

According to various embodiments, the first spiral rotating member may include a fifth surface (e.g., the fifth surface 611a of FIG. 23) facing the first slide area and a sixth surface (e.g., the sixth surface 613a of FIG. 23) facing the first slide area and substantially parallel to the first surface, and the second spiral rotating member may include a seventh surface (e.g., the seventh surface 621a of FIG. 23) facing the second slide area and an eighth surface (e.g., the eighth surface 623a of FIG. 23) facing the second slide area and substantially parallel to the seventh surface.

According to various embodiments, the first spiral rotating member may include a 1-1th spiral rotating member (e.g., the first spiral rotating member 610 of FIG. 22) including the fifth surface and a 1-2th spiral rotating member (e.g., the 1-2th spiral rotating member 613 of FIG. 22) connected with the 1-1th spiral rotating member and including the sixth surface, and the second spiral rotating member may include a 2-1th spiral rotating member (e.g., the 2-1th spiral rotating member 621 of FIG. 22) including the seventh surface and a 2-2th spiral rotating member (e.g., the 2-2th spiral rotating member 623 of FIG. 22) connected with the 2-1th spiral rotating member and including the eighth surface.

According to various embodiments, the first slide area may include a third spiral rotating rail (e.g., the 3-1th spiral rotating rail 631a and the 3-2th spiral rotating rail 631b of FIG. 22) facing the first spiral rotating member, and the second slide area may include a fourth spiral rotating rail (e.g., the 4-1th spiral rotating rail 633a and the 4-2th spiral rotating rail 633b of FIG. 22) facing the second spiral rotating member.

It is apparent to one of ordinary skill in the art that an electronic device including a hinge module as described above are not limited to the above-described embodiments and those shown in the drawings, and various changes, modifications, or alterations may be made thereto without departing from the scope of the disclosure.

What is claimed is:
1. An electronic device comprising:
a first housing;
a second housing;
a hinge module connected with the first housing and the second housing;
a hinge cover at least partially disposed between the first housing and the second housing; and
a flexible display disposed in the first housing and the second housing across the hinge module, wherein the hinge module includes:
a rotating structure including:
a first rotating member connected with the first housing;
a second rotating member connected with the second housing; and
a rotating bracket at least partially accommodated in a first portion of an accommodating recess of the hinge cover, and accommodating at least one portion of the first rotating member and at least one portion of the second rotating member; and an interlocking structure including:
  a first spiral rotating member connected with the first housing;
  a second spiral rotating member connected with the second housing; and
  a slide member at least partially spaced apart from the rotating structure and at least partially accommodated in a second portion of the accommodating recess of the hinge cover, and including a first area connected to at least one portion of the first spiral rotating member; and
  a second area connected to at least one portion of the second spiral rotating member; and
  wherein the slide member is configured to move based on a motion of at least one of the first spiral rotating member or a motion of the second spiral rotating member.

2. The electronic device of claim 1, wherein the first area of the slide member comprises a first through hole configured to accommodate at least one portion of the first spiral rotating member, and
wherein the second area of the slide member comprises a second through hole configured to accommodate the at least one portion of the second spiral rotating member.

3. The electronic device of claim 1, wherein the rotating bracket comprises:
  a first rotating space configured to accommodate the at least one portion of the first rotating member and providing a first rotational axis; and a second rotating space configured to accommodate the at least one portion of the second rotating member and providing a second rotational axis substantially parallel to the first rotational axis.

4. The electronic device of claim 3, wherein
the first area includes a first outer surface spaced apart from the first rotational axis by a first distance and a first inner surface spaced apart from the first rotational axis by a second distance shorter than the first distance, and
wherein the second area includes a second outer surface spaced apart from the second rotational axis by the first distance and a second inner surface spaced apart from the second rotational axis by the second distance.

5. The electronic device of claim 1, wherein the hinge module further comprises
  a fixing structure comprising:
    a first detent member connected to the first housing and facing at least one portion of the slide member; and
    a second detent member connected to the second housing and facing at least one portion of the slide member.

6. The electronic device of claim 1, wherein
the first spiral rotating member comprises:
  a first spiral rotating rail and at least one first protruding area extending from the first spiral rotating rail,
  wherein the at least one first protruding area protrudes in a length direction of the interlocking structure and faces or contacts at least one jammed side of the slide member,
  wherein the second spiral rotating member comprises
a second spiral rotating rail and
  at least one second protruding area extending from the second spiral rotating rail, and
  wherein the at least one second protruding area protrudes in the length direction of the interlocking structure and faces or contacts at least one jammed side of the slide member.

7. The electronic device of claim 6, wherein the slide member comprises a first structure configured to spirally rotate the first spiral rotating member around a first rotational axis, and a second structure for spirally rotating the second spiral rotating member around a second rotational axis.

8. The electronic device of claim 1, wherein
the first spiral rotating member comprises: a first bracket connected with the first housing; and
a first spiral rotating bracket extended from the first bracket and configured to rotate with respect to the first area of the slide member, and
wherein the second spiral rotating member comprises a second bracket connected with the second housing; and
a second spiral rotating bracket extended from the second bracket and configured to rotate with respect to the second area of the slide member.

9. The electronic device of claim 8, wherein the hinge module further comprises:
  a first guide member connected with the first housing and surrounding the at least one portion of the first spiral rotating member; and
  a second guide member connected with the second housing and surrounding the at least one portion of the second spiral rotating member, wherein the first spiral rotating bracket comprises: a first spiral rotating rail facing the first guide member; and
  a first protruding area extended from the first spiral rotating rail, and wherein the second spiral rotating bracket comprises: a second spiral rotating rail facing the second guide member; and
  a second protruding area extending from the second spiral rotating rail.

10. The electronic device of claim 1, wherein the hinge cover is configured to guide a movement of the slide member.

11. The electronic device of claim 1, wherein a distance between the slide member and the rotating structure is configured to vary based on an angle between the first housing and the second housing.

12. The electronic device of claim 1, wherein the rotating bracket comprises:
  a first rotating recessed portion configured to accommodate the at least one portion of the first rotating member; and
  a second rotating recessed portion configured to accommodate the at least one portion of the second rotating member.

13. The electronic device of claim 12,
wherein the first rotating member is configured to rotate about a first rotational axis provided by the first rotating recessed portion, and
wherein the second rotating member is configured to rotate about a second rotational axis provided by the second rotating recessed portion.

14. The electronic device of claim 1, wherein the first area of the slide member includes at least one first surface, and the second area of the slide member includes at least one second surface, and
  wherein the first spiral rotating member rotates at least partially in contact with the at least one first surface and the second spiral rotating member rotates at least partially in contact with the at least one second surface.

15. The electronic device of claim 14, wherein the at least one first surface of the first area of the slide member is in a spiral shape, and the at least one second surface of the second area of the slide member is in a spiral shape.

16. The electronic device of claim 1, wherein the slide member is formed in a single piece.

17. The electronic device of claim 1, wherein the hinge module further comprises a first hinge module and a second hinge module spaced apart from the first hinge module, and wherein the interlocking structure is disposed between the first the hinge module and the second hinge module.

18. The electronic device of claim 1, wherein the first spiral rotating member and the second spiral rotating member are symmetrical with respect to a lengthwise direction of the hinge module.

19. The electronic device of claim 1, wherein the first area of the slide member and the second area of the slide member are symmetrical with respect to a lengthwise direction of the hinge module.

20. The electronic device of claim 1, wherein the slide member is symmetrical with respect to a lengthwise direction of the hinge module.

* * * * *